(12) United States Patent
Brehmer et al.

(10) Patent No.: US 12,120,451 B2
(45) Date of Patent: Oct. 15, 2024

(54) AUGMENTING VIDEO WITH INTERACTIVE VISUALIZATIONS

(71) Applicant: Tableau Software, LLC, Seattle, WA (US)

(72) Inventors: Matthew Michael Brehmer, Seattle, WA (US); Brian David Hall, Ann Arbor, MI (US); Linda Ruth Bartram, Vancouver (CA)

(73) Assignee: Tableau Software, LLC, Seattle, WA (US)

( * ) Notice: Subject to any disclaimer, the term of this patent is extended or adjusted under 35 U.S.C. 154(b) by 69 days.

(21) Appl. No.: 17/714,691

(22) Filed: Apr. 6, 2022

(65) Prior Publication Data
US 2023/0328198 A1 Oct. 12, 2023

(51) Int. Cl.
*H04N 5/272* (2006.01)
*G06F 3/01* (2006.01)
*G06F 3/14* (2006.01)
*G06V 40/20* (2022.01)
*H04L 65/401* (2022.01)

(52) U.S. Cl.
CPC ............. *H04N 5/272* (2013.01); *G06F 3/017* (2013.01); *G06F 3/1454* (2013.01); *G06V 40/20* (2022.01); *H04L 65/401* (2022.05)

(58) Field of Classification Search
CPC ...... H04N 5/272; H04L 65/401; G06V 40/20; G06F 3/017; G06F 3/1454
USPC ..................................................... 348/14.08
See application file for complete search history.

(56) References Cited

U.S. PATENT DOCUMENTS

| 8,847,922 B1* | 9/2014 | Kurtz | H04N 9/75 |
| | | | 348/592 |
| 10,986,301 B1* | 4/2021 | Schanz | H04S 7/303 |
| 2009/0199078 A1* | 8/2009 | Caspi | H04N 7/152 |
| | | | 715/202 |

(Continued)

OTHER PUBLICATIONS

Matsumoto, David et al. (Eds.), "Chapter 4: Body and Gestures," in Nonverbal Communication: Science and Applications, Sage, 2013, pp. 75-96.

(Continued)

*Primary Examiner* — Binh Kien Tieu
(74) *Attorney, Agent, or Firm* — Morgan, Lewis & Bockius LLP

(57) ABSTRACT

Embodiments are directed to presenting visualizations over a network. A presentation specification. An overlay may be generated that includes visualizations of presentation objects based on the presentation specification. A video stream of a view of a presenter captured by a presenter station may be provided. A composited video stream may be generated based on the overlay and the video stream. The composited video stream may be provided to a video conference service that distributes the composited video stream to the presenter station and to audience stations. Movements of the presenter may be tracked based on the video stream captured by the presenter station. Gestures may be determined based on the tracked movements. In response to a determined gesture being associated with an interactive feature, activating the interactive feature to update the overlay such that the updated overlay may be included in a recomposited video stream.

18 Claims, 10 Drawing Sheets

(56) References Cited

U.S. PATENT DOCUMENTS

| | | | |
|---|---|---|---|
| 2016/0078289 A1* | 3/2016 | Michel | G06T 7/73 |
| | | | 345/156 |
| 2017/0039867 A1* | 2/2017 | Fieldman | G09B 7/00 |
| 2020/0066047 A1* | 2/2020 | Karalis | G06T 19/006 |
| 2022/0132090 A1* | 4/2022 | Deole | G06V 20/40 |
| 2022/0191258 A1* | 6/2022 | Sharp | H04N 7/152 |
| 2022/0291753 A1* | 9/2022 | Erivantcev | G06F 3/0482 |

OTHER PUBLICATIONS

Shedroff, Nathan et al., "Chapter 5: Gesture," in Make It So: Interaction Design Lessons from Science Fiction, Rosenfeld Media, 2012, pp. 91-108.

Shedroff, Nathan et al., "Chapter 8: Augmented Reality," in Make It So: Interaction Design Lessons from Science Fiction, Rosenfeld Media, 2012, pp. 157-176.

Amini, Fereshteh et al., "Understanding Data Videos: Looking at Narrative Visualization through the Cinematography Lens," In Proceedings of the ACM Conference on Human Factors in Computing Systems (CHI 2015), Apr. 2015, pp. 1-10.

Baudel, Thomas et al., "Charade: Remote Control of Objects using Free-Hand Gestures," Communications of the ACM, vol. 36, No. 7, Jul. 1993, pp. 1-7.

Bjuland, Raymond et al., "The Interplay Between Gesture and Discourse as Mediating Devices in Collaborative Mathematical Reasoning: A Multimodal Approach," Mathematical Thinking and Learning, vol. 10, No. 3, 2008, pp. 271-292.

Bolt, Richard A., "Put-That-There": Voice and Gesture at the Graphics Interface, In Proceedings of the 7th Annual ACM Conference on Computer Graphics and Interactive Techniques, Jul. 1980, pp. 262-270.

Boy, Jeremy et al., "Storytelling in Information Visualizations: Does it Engage Users to Explore Data?," In Proceedings of the ACM Conference on Human Factors in Computing Systems (CHI 2015), Apr. 2015, pp. 1-10.

Brehmer, Matthew et al., "From Jam Session to Recital: Synchronous Communication and Collaboration Around Data in Organizations," IEEE Transactions on Visualization and Computer Graphics, vol. 28, No. 1, Jan. 2022, pp. 1139-1149.

Brosz, John et al., "Transmogrification: Casual Manipulation of Visualizations," In Proceedings of the 26th Annual ACM Symposium on User Interface Software and Technology (UIST), Oct. 2013, pp. 1-10.

Bull, Peter, "The Use of Hand Gesture in Political Speeches: Some Case Studies," Journal of Language and Social Psychology, vol. 5, Iss. 2, Jun. 1986, pp. 103-118.

Cash, Philip et al., "Prototyping with your hands: the many roles of gesture in the communication of design concepts," Journal of Engineering Design, vol. 27, Nos. 1-3, 2016, pp. 118-145.

Chen, Xi et al., "Composition and Configuration Patterns in Multiple-View Visualizations," IEEE Transactions on Visualization and Computer Graphics (Proceedings of InfoVis), arXiv preprint, arXiv:2007.15407v2, Aug. 2020, pp. 1-11.

Chung, John Joon Young et al., "Beyond Show of Hands: Engaging Viewers via Expressive and Scalable Visual Communication in Live Streaming," In Proceedings of the ACM Conference on Human Factors in Computing Systems (CHI 2021), Article No. 109, May 2021, pp. 1-14.

Cirelli, Mauricio et al., "A Survey on Multi-touch Gesture Recognition and Multi-touch Frameworks," In Proceedings of the ACM International Conference on Interactive Tabletops and Surfaces (ITS 2014), Nov. 2014, pp. 35-44.

Clarke, Jean S. et al., "Actions Speak Louder than Words: How Figurative Language and Gesturing in Entrepreneurial Pitches Influences Investment Judgments," Academy of Management Journal, 2019, pp. 1-56.

Conlen, Matthew et al., "Idyll: A Markup Language for Authoring and Publishing Interactive Articles on the Web," In Proceedings of the ACM Symposium on User Interface Software and Technology (UIST 2018), Oct. 2018, pp. 1-13.

Cordeil, Maxime et al., "ImAxes: Immersive Axes as Embodied Affordances for Interactive Multivariate Data Visualisation," In Proceedings of the 30th Annual ACM Symposium on User Interface Software and Technology, Oct. 2017, pp. 1-13.

Cornelissen, Joep P. et al., "Sensegiving in entrepreneurial contexts: The use of metaphors in speech and gesture to gain and sustain support for novel business ventures," International Small Business Journal, vol. 30, No. 3, 2012, pp. 213-241.

Cuccurullo, Stefania et al., "A gestural approach to presentation exploiting motion capture metaphors," In Proceedings of the International Working Conference on Advanced Visual Interfaces (AVI 2012), May 2012, pp. 148-155.

Dimara, Evanthia et al., "The Unmet Data Visualization Needs of Decision Makers within Organizations," To appear in IEEE Transactions on Visualization and Computer Graphics (TVCG) 28, TBA (2022), 2021, pp. 1-12.

Dohen, Marion et al., "Co-production of speech and pointing gestures in clear and perturbed interactive tasks: multimodal designation strategies," In Proceedings of the 18th Annual Conference of the International Speech Communication Association (Interspeech 2017), Aug. 2017, pp. 166-170.

Drucker, Steven M. et al., "A Unifying Framework for Animated and Interactive Unit Visualizations," Microsoft Research Technical Report, MSR-TR-2015-65, Aug. 2015, pp. 1-9.

Drucker, Steven et al., "Communicating Data to an Audience," Chapter 9 in Data-Driven Storytelling, CRC Press, 2018, pp. 1-19.

Edwards, Laurie D., "The Role of Gestures in Mathematical Discourse: Remembering and Problem Solving," In Proceedings of the 29th Conference of the International Group for the Psychology of Mathematics Education, vol. 1, Jul. 2005, pp. 135-138.

Fourney, Adam et al., "Gesturing in the Wild: Understanding the Effects and Implications of Gesture-Based Interaction for Dynamic Presentations," In Proceedings of the Human-Computer Interaction Conference (HCI 2010), Sep. 2010, pp. 230-240.

Gong, Jiangtao et al., "HoloBoard: a Large-format Immersive Teaching Board based on pseudo HoloGraphics," In Proceedings of the 34th Annual ACM Symposium on User Interface Software and Technology (UIST 2021), Oct. 2021, pp. 441-456.

Grønbæk, Jens Emil et al., "MirrorBlender: Supporting Hybrid Meetings with a Malleable Video-Conferencing System," In Proceedings of the ACM Conference on Human Factors in Computing Systems (CHI 2021), Article No. 451, May 2021, pp. 1-13.

Harika, Maisevli et al., "Finger-Pointing Gesture Analysis for Slide Presentation," Journal Of Korea Multimedia Society, vol. 19, No. 8, Aug. 2016, pp. 1225-1235.

Harrison, Simon, "Showing as sense-making in oral presentations: The speech-gesture-slide interplay in TED talks by Professor Brian Cox," Journal of English for Academic Purposes, vol. 53, 2021, pp. 1-19.

He, Zhenyi et al., "GazeChat: Enhancing Virtual Conferences with Gaze-aware 3D Photos," In Proceedings of the 34th Annual ACM Symposium on User Interface Software and Technology (UIST 2021), Oct. 2021, pp. 769-782.

Heer, Jeffrey et al., "Animated Transitions in Statistical Data Graphics," IEEE Transactions on Visualization and Computer Graphics, vol. 13, No. 6, Nov./Dec. 2007, pp. 1240-1247.

Hullman, Jessica et al., "Visualization Rhetoric: Framing Effects in Narrative Visualization," IEEE Transactions on Visualization and Computer Graphics, vol. 17, No. 12, Dec. 2011, pp. 2231-2240.

Issartel, Paul et al., "Slicing Techniques for Handheld Augmented Reality," In Proceedings of the 2014 IEEE Symposium on 3D User Interfaces (3DUI), Mar. 2014, pp. 1-4.

Kosara, Robert, "Presentation-Oriented Visualization Techniques," IEEE Computer Graphics and Applications (CG&A), vol. 36, Jan. 2016, pp. 80-85.

Kosara, Robert, "An Argument Structure for Data Stories," In Short Paper Proceedings of the Eurographics / IEEE VGTC Conference on Visualization (EuroVis), 2017, pp. 1-5.

Lascarides, Alex et al., "Discourse coherence and gesture interpretation," Gesture, 2007, pp. 1-58.

(56) References Cited

OTHER PUBLICATIONS

Lee, Bongshin et al., "SketchStory: Telling More Engaging Stories with Data through Freeform Sketching," IEEE Transactions on Visualization and Computer Graphics, vol. 19, No. 12, 2013, pp. 1-10.

Lee, Hyeon-Kyu et al., "An HMM-based threshold model approach for gesture recognition," IEEE Transactions on Pattern Analysis and Machine Intelligence, vol. 21, No. 10, Oct. 1999, pp. 961-973.

Maurer, Bernhard et al., "Exploring Gaze and Hand Gestures for Non-Verbal In-Game Communication," In Extended Abstracts Publication of the Annual Symposium on Computer-Human Interaction in Play (CHI Play 2017), Oct. 2017, pp. 315-322.

McInnis, Brian James et al., "Rare, but Valuable: Understanding Data-centered Talk in News Website Comment Sections," In Proceedings of the ACM on Human-Computer Interaction, vol. 4. No. CSCW2, Article 174, Oct. 2020, pp. 1-27.

McKenna, Sean et al., "Visual Narrative Flow: Exploring Factors Shaping Data Visualization Story Reading Experiences," Computer Graphics Forum (Proceedings of EuroVis 2017), vol. 36, No. 3, 2017, pp. 1-11.

Pandey, Anshul Vikram et al., "The Persuasive Power of Data Visualization," IEEE Transactions on Visualization and Computer Graphics, vol. 20, No. 12, Dec. 2014, pp. 2211-2220.

Perlin, Ken, "Introduction to Chalktalk," https://github.com/kenperlin/chalktalk/wiki/Introduction-to-Chalktalk/, 2017, Accessed: Apr. 27, 2022, pp. 1-8.

Qian, Jing et al., "Portal-ble: Intuitive Free-hand Manipulation in Unbounded Smartphone-based Augmented Reality," In Proceedings of the 32nd Annual ACM Symposium on User Interface Software and Technology (UIST 2019), Oct. 2019, pp. 133-145.

Qu, Zening et al., "Keeping Multiple Views Consistent: Constraints, Validations, and Exceptions in Visualization Authoring," IEEE Transactions on Visualization and Computer Graphics, vol. 24, No. 1, Jan. 2018, pp. 1-10.

Ren, Donghao et al., "ChartAccent: Annotation for data-driven storytelling," In Proceedings of the IEEE Pacific Visualization Symposium (PacificVis 2017), Apr. 2017, pp. 1-10.

Ruchikachorn, Puripant et al., "Learning Visualizations by Analogy: Promoting Visual Literacy through Visualization Morphing," IEEE Transactions on Visualization and Computer Graphics (TVCG), vol. 21, No. 9, 2015, pp. 1-14.

Saket, Bahador et al., "Visualization by Demonstration: An Interaction Paradigm for Visual Data Exploration," IEEE Transactions on Visualization and Computer Graphics (Proceeings of InfoVis 2017), vol. 23, No. 1, 2017, pp. 331-340.

Saquib, Nazmus et al., "Interactive Body-Driven Graphics for Augmented Video Performance," In Proceedings of the 2019 CHI Conference on Human Factors in Computing Systems, Paper No. 622, May 2019, pp. 1-12.

Satyanarayan, Arvind et al., "Authoring Narrative Visualizations with Ellipsis," Computer Graphics Forum (Proceedings of EuroVis 2014), vol. 33, No. 3, 2014, pp. 1-10.

Satyanarayan, Arvind et al., "Critical Reflections on Visualization Authoring Systems," arXiv preprint, arXiv:1907.13568v1, Jul. 2019, pp. 1-11.

Segel, Edward et al., "Narrative Visualization: Telling Stories with Data," IEEE Transactions on Visualization and Computer Graphics (Proceedings of InfoVis 2010), vol. 16, No. 6, 2010, pp. 1-10.

Smith, Steven, "The Digital Chironomia," Enculturation, Nov. 2019, https://www.enculturation.net/the-digital-chironomia, Accessed: Apr. 27, 2022, pp. 1-38.

Subramonyam, Hariharan et al., "SmartCues: A Multitouch Query Approach for Details-on-Demand through Dynamically Computed Overlays," IEEE Transactions on Visualization and Computer Graphics, vol. 25, No. 1, Jan. 2019, pp. 597-607.

Verhulsdonck, Gustav et al., "Virtual Chironomia: Developing Standards for Non-verbal Communication in Virtual Worlds," Journal for Virtual Worlds Research, vol. 2, No. 3, Oct. 2009, pp. 1-10.

Viz Virtual Studio, "Tracking Hub Administrator Guide Version 1.5," Vizrt, 2022, https://docs.vizrt.com/tracking-hub-guide-1.5.pdf, Accessed: May 4, 2022, pp. 1-167.

Viz Virtual Studio, "Tracking Hub Command Interface Version 1.5," Vizrt, 2022, https://docs.vizrt.com/tracking-hub-ci-1.5.pdf, Accessed: May 4, 2022, pp. 1-16.

Viz Virtual Studio, "Tracking Hub and Studio Manager Release Notes Version 1.5," Vizrt, 2022, https://docs.vizrt.com/tracking-hub-rn-1.5.pdf, Accessed: May 4, 2022, pp. 1-13.

Viz Arc, "Viz Arc Release Notes Version 1.4," Vizrt, 2022, https://docs.vizrt.com/viz-arc-rn-1.4.pdf, Accessed: May 4, 2022, pp. 1-17.

Viz Arc, "Viz Arc Script Guide Version 1.4," Vizrt, 2022, https://docs.vizrt.com/viz-arc-script-guide-1.4.pdf, Accessed: May 4, 2022, pp. 1-62.

Viz Arc, "Viz Arc User Guide Version 1.4," Vizrt, 2022, https://docs.vizrt.com/viz-arc-user-guide-1.4.pdf, Accessed: May 4, 2022, pp. 1-285.

Viz Engine, "Viz Engine Administrator Guide Version 4.3," Vizrt, 2021, https://docs.vizrt.com/viz-engine-guide-4.3.pdf, Accessed: May 4, 2022, pp. 1-434.

Viz Engine, "Viz Engine Release Notes Version 4.3," Vizrt, 2021, https://docs.vizrt.com/viz-engine-rn-4.3.pdf, Accessed: May 4, 2022, pp. 1-35.

XR Set Express, "XR Set Express Quick Start Guide Version 1.0," Vizrt, 2021, https://docs.vizrt.com/xrsx-qsg-1.0.pdf, Accessed: May 4, 2022, pp. 1-9.

XR Set Express, "XR Set Express Release Notes Version 1.0," Vizrt, 2021, https://docs.vizrt.com/xrsx-rn-1.0.pdf, Accessed: May 4, 2022, pp. 1-7.

Vuletic, Tijana et al., "Systematic literature review of hand gestures used in human computer interaction interfaces," International Journal of Human-Computer Studies, vol. 129, Sep. 2019, pp. 1-38.

Wagner, Petra et al., "Gesture and speech in interaction: An overview," Speech Communication, vol. 57, Feb. 2014, pp. 209-232.

Wigdor, Daniel et al., "Lucid touch: A see-through mobile device," In Proceedings of the 20th Annual ACM Symposium on User Interface Software and Technology, Oct. 2007, pp. 269-278.

Willett, Wesley et al., "Strategies for crowdsourcing social data analysis," In Proceedings of the SIGCHI Conference on Human Factors in Computing Systems (CHI 2012), May 2012, pp. 227-236.

Winter, Bodo et al., "Using space to talk and gesture about numbers: Evidence from the TV News Archive," Gesture, vol. 13, Iss. 3, Jan. 2013, pp. 377-408.

Zhao, Zhenpeng et al., "The Stories We Tell About Data: Media Types for Data-Driven Storytelling," arXiv preprint, arXiv:2202.00047, Jan. 2022, pp. 1-15.

Radford, Luis, "Why do gestures matter? Sensuous cognition and the palpability of mathematical meanings," Educational Studies in Mathematics, vol. 70, No. 2, Mar. 2009, pp. 111-126.

\* cited by examiner

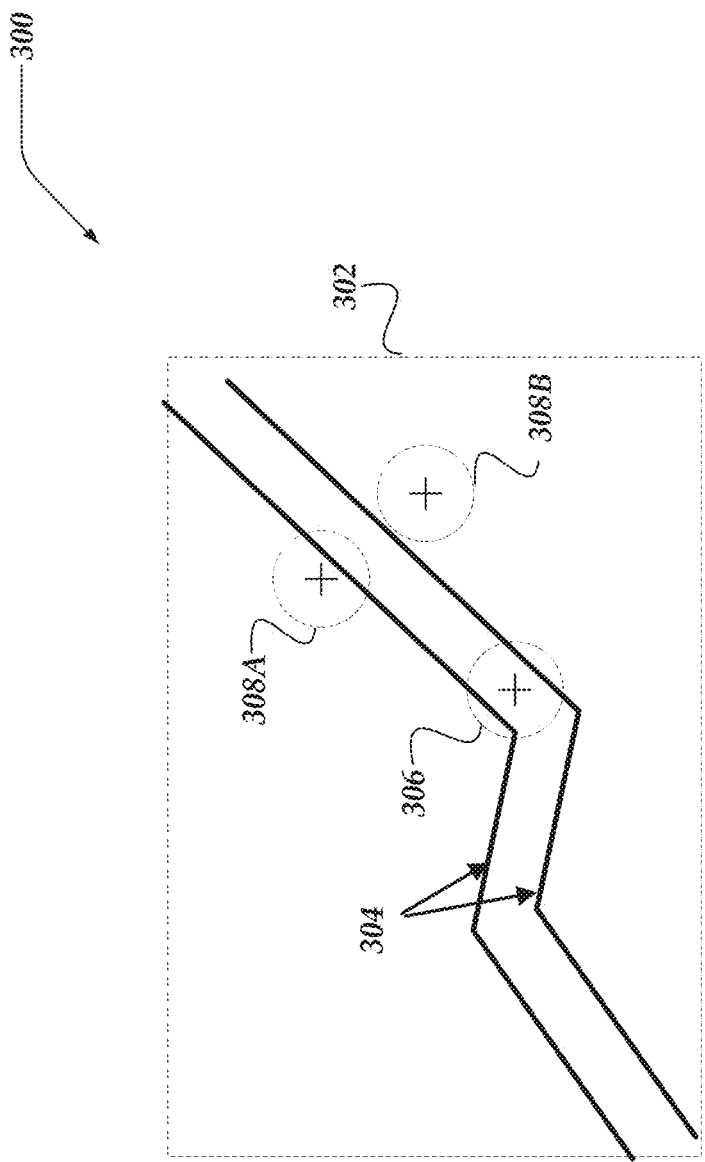

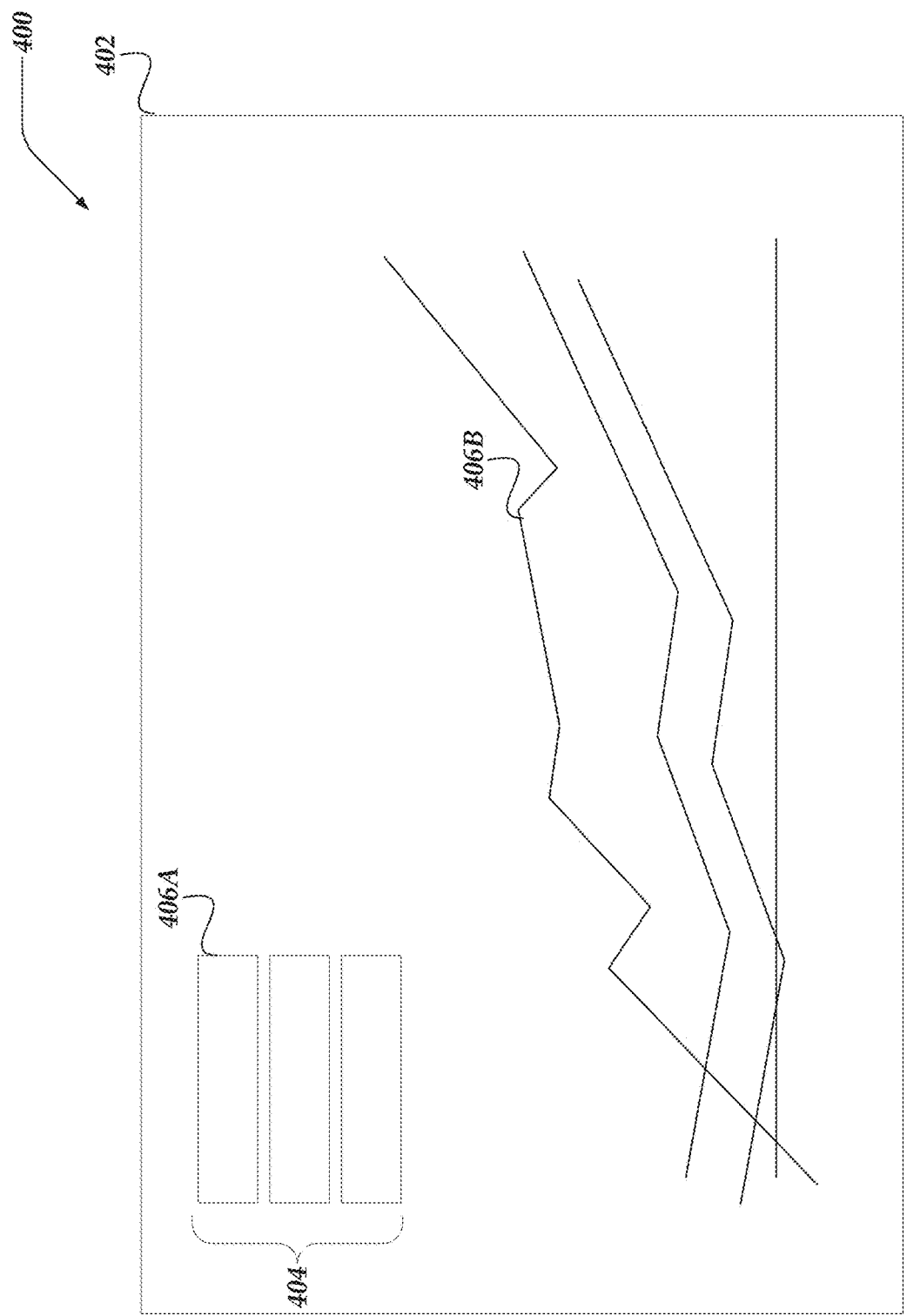

```
//#region Scene Definitions
// Define the scene objects we'll be using, in the order they'll be used.

let sceneList = [                    ~ 502
    new Scene(                                  ← 504
        "tuition-overall",
        "Tuition Cost in Washington State, 1965 - 2019 [vertical reference line]",   ← 506
        {
            sceneChartPropPair("line_tuition", function () {    ← 508
                return {
                    chartHeight: 10,
                    chartWidth: 20,
                    chartMargin: 10,
                    chartPositionX: 1 - viewWidth * 1.5,
                    chartPositionY: viewHeight / 2,
                    usePlotlineHighlighting: true,      ← 510
                    useMaskHighlighting: false,
                    ...
                };
            }),
        }
    ),
    new Scene(                                  ← 512
        "uw-tuition-source_tuition",
        "Compare Tuition to Enrollment [multi-chart lines, snap to show, crisp for total]",
        {
            sceneChartPropPair("area_uw_enrollment", chartConfigs.miniTopLeft, {
                supportCopying: false,
            }), sceneChartPropPair("stackedarea_funding_source", chartConfigs.mainBottom, {
                exitSceneOption: "fade",
            }),
        }
    ),
    ...

addNewChartObject(      ← 514
    MultiLineStudentCost,
    "line_tuition",
    "line chart showing average tuition over time across institution types"
    dataSource: ...      ← 516
});

AUGMENTING VIDEO WITH INTERACTIVE VISUALIZATIONS

The present invention relates generally to data visualizations, and more particularly, but not exclusively to, presenting interactive visualizations to remote audiences.

BACKGROUND

While remote meetings and presentations have been taking place within and between organizations for years, they are now becoming more common as a result of the shift to more globalized or distributed markets and remote work forces.

Data presentation practices within organizations conventionally involve a series of prepared slides that may be shown while delivering an accompanying spoken monologue. With the increasing shift to remote presentations, presentation slides may often be delivered via so-called screen-sharing, where video that shows the presenters may be relegated to a peripheral thumbnail view. Further, visualizations appearing on slide presentations are typically static, or they may be annotated using a limited palette of attention-directing cues (text labels, arrows, reference lines) that may be delivered in a staged pre-defined sequence. Also, in some cases, presenters may screen-share views or dashboards provided by interactive applications (e.g., business intelligence platforms, or the like). However, the ability to direct an audience's attention and present a linear narrative can be challenging, as such applications tend not to prioritize the use case of live presentation. Accordingly, in some cases, it may be difficult for viewers to engage with presenters and the visual content they present using conventional approaches. Thus, it is with respect to these considerations and others that the present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 3 illustrates a logical schematic of a portion of a presentation for augmenting video with interactive visualizations in accordance with one or more of the various embodiments;

FIG. 4 illustrates a logical schematic of a view window for augmenting video with interactive visualizations in accordance with one or more of the various embodiments;

FIG. 5 illustrates an example of a portion of a presentation specification for augmenting video with interactive visualizations in accordance with one or more of the various embodiments;

DETAILED DESCRIPTION OF VARIOUS EMBODIMENTS

Figure 1:
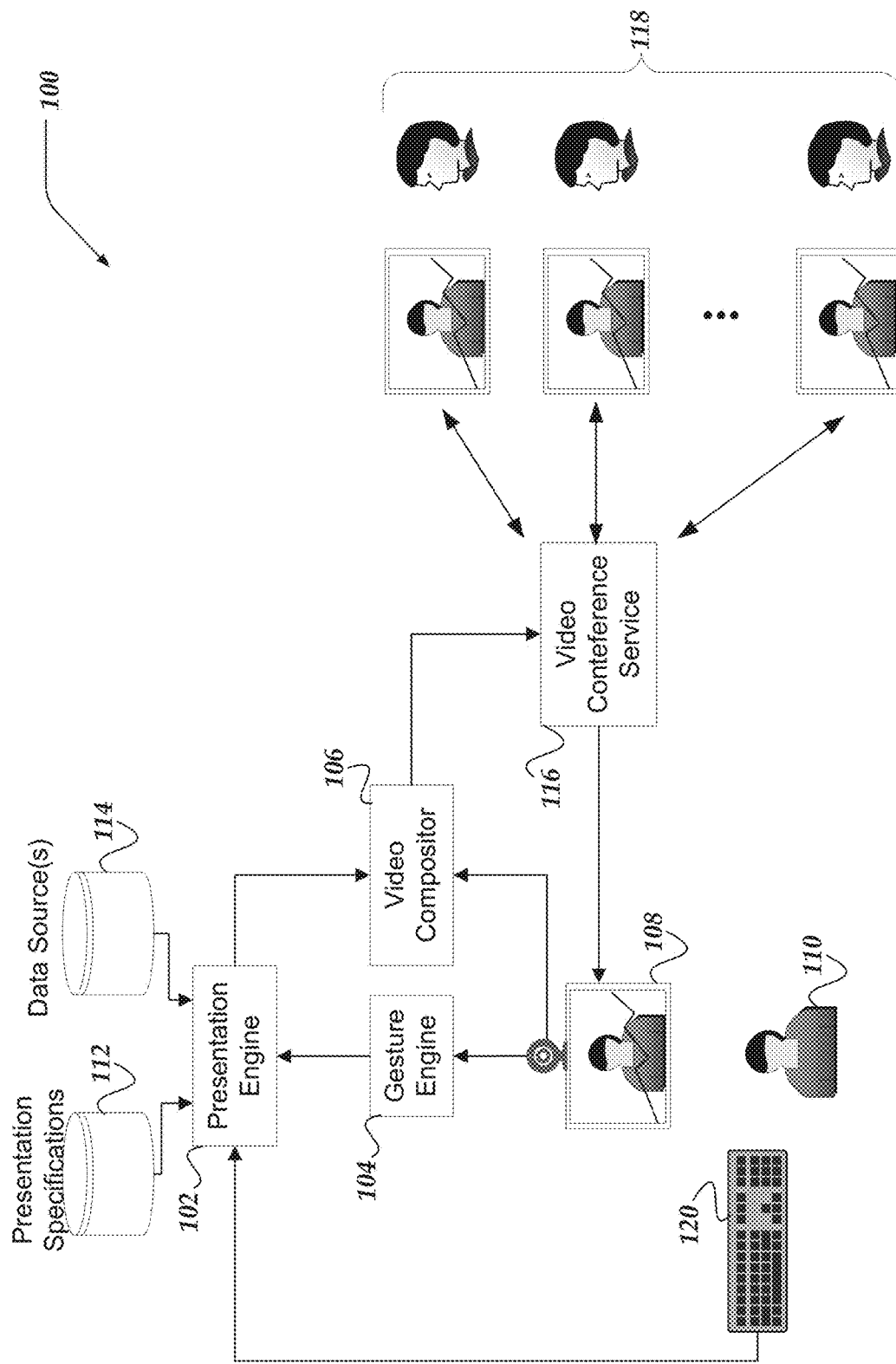
FIG. 1 illustrates a logical architecture of a video presentation system for augmenting video with interactive visualizations in accordance with one or more of the various embodiments.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications or can be divided into sub-engines. The engines can be stored in non-transitory computer-readable medium or computer storage device and be stored on and executed by one or more general purpose computers, thus creating a special purpose computer configured to provide the engine.

As used herein the term "data source" refers to the source of the underlying information that is being modeled or otherwise analyzed. Data sources may include information from or provided by databases (e.g., relational, graph-based, NoSQL, or the like), file systems, unstructured data, streams, or the like. Data sources are typically arranged to model, record, or memorialize various operations or activities associated with an organization. In some cases, data sources are arranged to provide or facilitate various data-focused actions, such as, efficient storage, queries, indexing, data exchange, search, updates, or the like. Generally, a data source may be arranged to provide features related to data manipulation or data management rather than providing an easy-to-understand presentation or visualization of the data.

As used herein the term "presentation" refers to a digital/computer based display of information that a presenter may present from a computer.

As used herein the term "presentation specification" refers a file, data structures, data objects, or the like, used to declare one or more directives that define the content, appearance, and interactive features of a presentation.

As used herein the terms, "presenter station" refers to a computer or computer device that a presenter of a presentation may be using to present the presentation. Presenter stations may be considered to be one or more client computers or network computers (as described below).

Presenter stations may include video cameras that can capture the relevant physical movements of the person presenting the presentation.

As used herein the terms, "audience station" refers to a computer or computer device that one or more persons may be using to view a presentation. Audience stations may be considered to be one or more of client computers or network computers (as described below).

As used herein the term "view window" refers to a software defined viewport on a computer display where a presentation may be displayed or viewed. The extents of the view window may be based on client application used by the presenter or audience members of the presentation. Note, a video teleconferencing client may provide more than one viewport, each for different purposes. For example, a main viewport (e.g., the view window) may be used to display the presentation and smaller/subordinate viewports may display one or more audience members, or the like. Further, in some cases, other systems, such as, operating systems of the presenter or audience computer may provide one or more other windows unrelated to the presentation view window.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to presenting visualizations over a network. In one or more of the various embodiments, a presentation specification may be provided such that the presentation specification includes one or more directives that may include declarations for one or more presentation objects or one or more interactive features associated with the one or more presentation objects.

In one or more of the various embodiments, an overlay may be generated that includes one or more visualizations of the one or more presentation objects based on the presentation specification.

In one or more of the various embodiments, a video stream of a view of a presenter captured by the presenter station may be provided.

In one or more of the various embodiments, a composited video stream may be generated based on the overlay and the video stream such that the overlay may be displayed in a foreground of the composited video stream and the presenter may be displayed in a background of the composited video stream relative to the foreground display of the overlay.

In one or more of the various embodiments, the composited video stream may be provided to a video conference service that distributes the composited video stream to the presenter station and to one or more audience stations over the network.

In one or more of the various embodiments, one or more physical movements of the presenter in the view may be tracked based on the video stream captured by the presenter station.

In one or more of the various embodiments, one or more gestures may be determined based on the one or more tracked physical movements.

In one or more of the various embodiments, in response to a determined gesture being associated with an interactive feature, activating the interactive feature to update the overlay such that the updated overlay may be included in a recomposited video stream that may be provided to the video conference service for distribution.

In one or more of the various embodiments, tracking the one or more physical movements of the presenter may include providing the video stream from the presenter station to a motion tracking service such that the motion tracking service may provide motion information that includes position information associated with one or more of the presenter's hands, fingers, eyes, head, posture, or the like.

In one or more of the various embodiments, determining the one or more gestures may include: providing one or more gesture models that may correspond to the one or more gestures; mapping the one or more tracked physical movements to the one or more gestures based on motion information that may correspond to the one or more tracked physical movements and the one or more gesture models; or the like.

In one or more of the various embodiments, activating the interactive feature may include: determining one or more activation conditions for the activated interactive feature based on the presentation specification; determining the activated interactive feature based on one or more coordinates associated with the one or more gestures and the one or more activation conditions; or the like.

In one or more of the various embodiments, updating the presentation overlay based on the activated interactive feature may include: determining the one or more presentation objects that may correspond to the activated feature based on the presentation specification; determining one or more actions associated with the one or more presentation objects based on the presentation specification; executing the one or more actions; or the like.

In one or more of the various embodiments, generating the overlay that includes the one or more visualizations of the one or more presentation objects may include: positioning the one or more visualizations of the presentation objects in the foreground of the overlay; modifying an alpha channel of the overlay to improve the visibility of the presenter in the composited video stream.

In one or more of the various embodiments, a portion of the one or more interactive features may be associated with a first presentation object. And, in response to one or more determined gestures being associated with the portion of interactive features, executing one or more actions directed to one or more of the first presentation object or one or more other presentation objects.

Illustrative Logical System Architecture

FIG. 1 illustrates a logical architecture of video presentation system 100 for augmenting video with interactive visualizations in accordance with one or more of the various embodiments. In some embodiments, video presentation systems, such as, system 100 may be comprised of one or more of presentation engine 102, gesture engine 104, video compositor 106, presenter station 108, presenter 110, one or more presentation specifications 112, one or more data sources 114, video teleconference service 116, one or more audience stations 118, off-screen presenter input tools 120, or the like.

In one or more of the various embodiments, video presentation system 100 may be arranged to enable augmenting video with interactive visualizations. Accordingly, in some embodiments, presenter 110 may display or direct a video presentation from presenter station 108. The presentation may be presented via video teleconference service 116 to one or more other persons that may be observing the presentation on their local audience stations, such as, audience stations 118.

In one or more of the various embodiments, presenter 110 may be enabled to select a presentation specification that declares one or more scenes for the presentation. In some embodiments, each scene may be defined using one or more directives that declare one or more presentation objects, such as, charts, graphs, maps, legends, tables, lists, or the like. Also, in some embodiments, presentation specifications may include directives for styling or formatting the appearance of presentations, such as, fonts, color schemes, decorative graphics, or the like. In some embodiments, the presenter may employ video presentation system 100 to share the presentation to one or more audience stations, such as, audience stations 118 to enable one or more audience members to remotely view the presentation.

Also, in some embodiments, video presentation systems may be arranged to enable the presenter to be simultaneously displayed with the current presentation scene overlaid on the same view window as the presentation. Accordingly, in some embodiments, information/graphics of presentation displayed in the view window (e.g., presentation overlay) may appear "in front" of the presenter from the viewers' perspective. Thus, in some embodiments, video presentation systems may enable the presentation audience to simultaneously view the presenter and the presentation objects (e.g., charts, lists, graphs, annotations, or the like) in the same view window. In contrast, for example, conventional video conference systems may enable presenters to 'share' the presentation information (or other documents) in a main view while a view of the presenter may be hidden or shown in a separate view disconnected from the presentation view. And, often the presenter may be shown in a view that may be much smaller than the main video view showing the shared presentation information.

Here, in some embodiments, video presentation system 100 shows the presentation as a foreground overlay in the same view window as the presenter. Thus, in some embodiments, both the presenter and the presentation information may be shown together in the main video window. Accordingly, in some embodiments, the presentation may be rendered to have a transparent background to enable the presenter to be visible behind the overlaid presentation information. The transparent background enables the presenter to be visible even though the presentation may be displayed in the view window in front of the presenter.

Further, in some embodiments, video presentation system 100 may enable the presenter to view the same view of the presentation that the audience members see, including seeing a video image of themselves as it would appear to the audience members.

In one or more of the various embodiments, presenter stations, such as, presenter station 108 may include a video camera pointed at the presenter. Accordingly, in some embodiments, this video camera collects the real-time video stream of the presenter as they may be hosting/directing the presentation.

In some embodiments, video presentation system 100 may include a gesture engine, such as, gesture engine 104 that may be arranged to employ one or more machine-vision methods to track various motions or activity of the presenter. In some embodiments, gesture engine 104 may be arranged to determine one or more gestures from the observed presenter motions. For example, in some embodiments, gesture engines may be arranged to determine various hand gestures from presenter hand/finger movement, such as, pointing, dragging, swiping, pinching, dragging, crimping, or the like.

In one or more of the various embodiments, gesture engines may be arranged to receive the video stream that includes motion of the presenter, such as, hand motion, finger motions, or the like. In some embodiments, gesture engines may be arranged to classify the motion to identify various predefined gesture types as well as the geometry information of the identified gestures, such as location of gesture in the view plane.

In some embodiments, gesture engines may be arranged to submit the video stream to one or more external or internal services (not shown) that may be dedicated to identifying or tracking hand or body motion in video. Also, in some embodiments, gesture engines may be arranged to locally track or classify motion. Further, in some embodiments, gesture engines may be arranged to employ external services for tracking motion while employing local gesture models to classify tracked motion into specific gestures. In some embodiments, gesture models may be considered to comprise one or more data structures, rules, heuristics, machine-learning classifiers, or the like, that may be employed to determine or predict one or more gestures from tracked motion of the presenter.

In one or more of the various embodiments, gesture engine 104 may be arranged to provide gesture information to presentation engine 102. In some embodiments, gesture information may include the name or label of a particular gesture (e.g., point, touch, pinch, drag, or the like) and the relevant geometry information that may be translated to a location in the view window the presentation.

In one or more of the various embodiments, in addition to declaring presentation objects, presentation specifications may include one or more directives that may declare one or more interactions for the included scenes or presentation objects. In some embodiments, interactive features may be associated with one or more gestures that may activate one or more actions associated with the activate interaction feature.

Accordingly, in some embodiments, presentation engine 102 may be arranged to compare the gesture information provided by gesture engine 104 to the interactive features (if any) that may be declared for the current scene to determine if the gesture activates one or more interactive features in the current scene.

In some embodiments, presentation engines may be arranged to translate or scale coordinates provided by the gesture engine to screen coordinates appropriate for the view window of the presentation. For example, in some embodiments, gesture engines may be configured to provide geometric coordinates using normalized coordinates where the coordinate position in each direction/dimension is represented as a value from 0.0 to 1.0. Accordingly, for example, in some embodiments, presentation engines may be arranged to translate or scale the normalized coordinates into values that map appropriately to the dimensions of the screen coordinates of the video window used for displaying the presentation. Note, in some embodiments, video presentation systems may be arranged to enable presenters to calibrate coordinate translations or coordinate scaling by guiding the presenter through a sequence of motions to determine the visible/relevant extents of the view window.

In one or more of the various embodiments, presentation engine 102 may be arranged to render presentation specifications into presentations that may be displayed in the view window. Accordingly, in some embodiments, presentation engines may be arranged to compile presentation specifications into presentation objects that may be displayed in the view window. Also, in some embodiments, presentations may be associated with one or more data sources that may provide data represented in the presentations. For example, in some embodiments, presentation engines may be part of a data visualization platform that enables users to author visualizations based on data from various data sources. Accordingly, in some embodiments, presentations may include visualizations that may be based on data stored in one or more data sources. Thus, in some cases, for some embodiments, presentation engines may be arranged to execute one or more queries, or the like, to fetch data from one or more data sources for generating one or more of the presentation objects. Also, in some embodiments, presentation specifications may be configured to include static or embedded data that may be used to generate the presentation objects used in the presentations.

In one or more of the various embodiments, presentation engine 102 may be arranged to provide the presentation overlay and the video stream of the presenter from presenter station 108 to video compositor 106. In one or more of the various embodiments, video compositors, such as, video compositor 106 may be arranged to produce a video stream that combines the presentation overlay with the video stream collected from presenter station 108.

In some embodiments, video compositor 106 may be arranged to provide the combined video stream to a video conference service, such as, video conference service 116. Thus, video conference service 116 may be configured to treat the combined video stream as a conventional presenter video stream that would otherwise be provided directly from the presenter's station.

Accordingly, in some embodiments, video conference service 116 may provide the combined video stream to one or more audience stations to enable one or more audience members, such as, audience members 118 to participate in the video conference. Note, here the term video conference may also refer to similar video distribution events, such as, video broadcasts, webinars, or the like, that may or may not enable audience members to interact/communicate with the presenter.

In one or more of the various embodiments, presenter stations, such as, presenter station 108 may include one or more off-screen or off-camera input devices, such as, keyboard 120. Likewise, presenters may be provided one or more user interfaces that may be hidden from the view of audience members. Accordingly, in some embodiments, these out-of-view user interfaces or input devices may be used to collect one or more commands from the presenter to conduct or otherwise administer the presentation. For example, in some embodiments, presenters may advance presentations from one scene to the next scene using arrow keys, or the like, of a keyboard, such as, keyboard 120.

Figure 2:
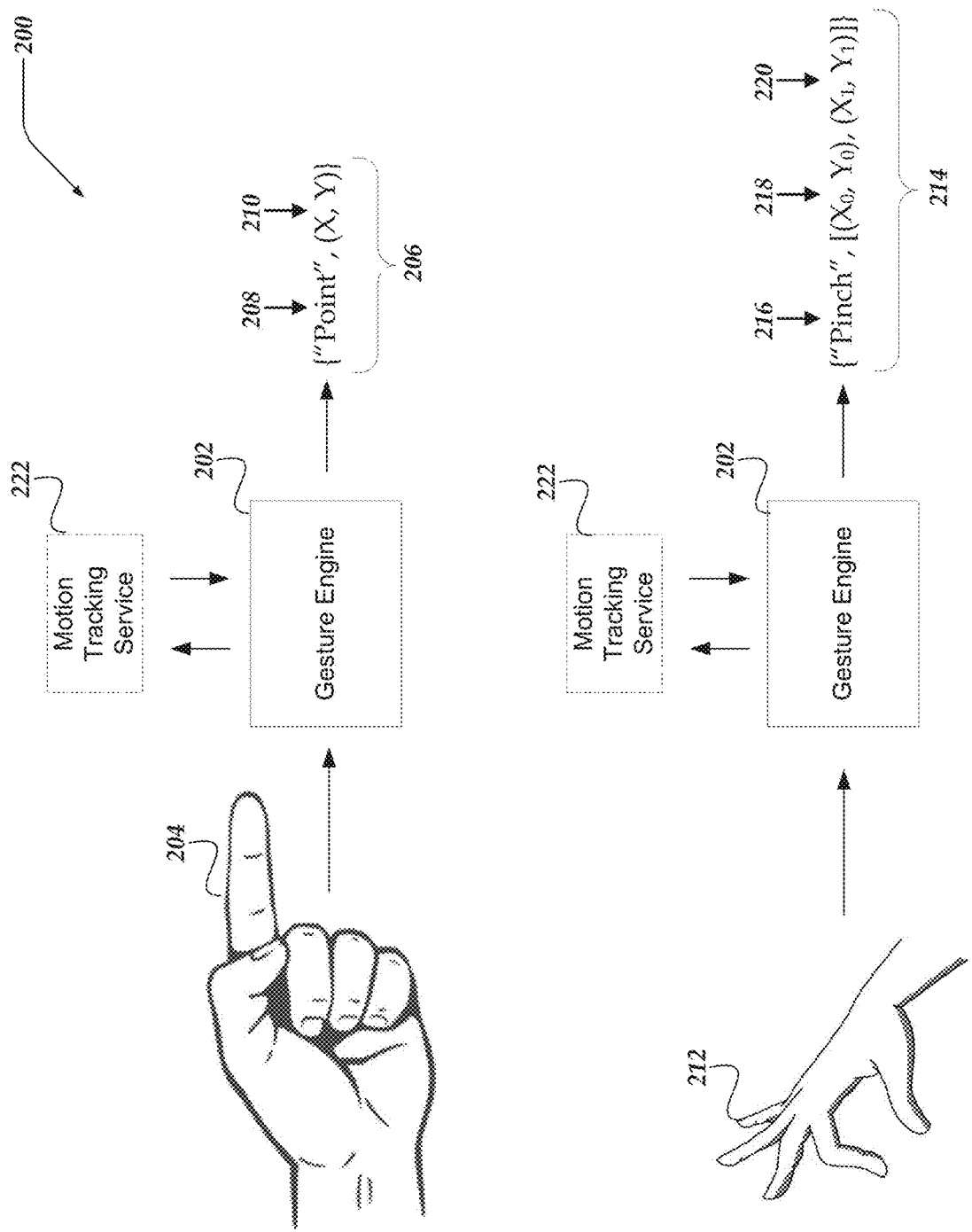
FIG. 2 illustrates a logical schematic of a system for determining gestures for augmenting video with interactive visualizations in accordance with one or more of the various embodiments.

FIG. 2 illustrates a logical schematic of system 200 for determining gestures for augmenting video with interactive visualizations in accordance with one or more of the various embodiments. As described above, gestures engines may be provided video streams from a video input subsystem of the presenter station. In some embodiments, this video stream may show the real-time movements or motions of the presenter. In one or more of the various embodiments, gesture engines, such as, gesture engine 202 may be arranged to employ machine-vision techniques to identify or track different types of motions of presenters. In some embodiments, gesture engines may include one or more software libraries, machine-learning classifiers, heuristics, or the like, to determine one or more particular gestures from the presenter activity. In some embodiments, gesture engines may be arranged to focus on particular types of actions, such as, hand movements, finger movements, finger positioning, hand shapes, or the like. For example, in some embodiments, gesture engines may be configured to track position and movement of the thumbs, forefingers, and palm centroids of both of the presenter's hands.

In some embodiments, gesture engines may be enabled to employ one or more external or self-hosted motion tracking services to determine one or more specific features of the presenter motions. For example, in some embodiments, gesture engine 202 may be configured to forward the video stream to motion tracking service 222. Accordingly, in some embodiments, motion tracking service 222 may respond with a description of motion that may be mapped to one or more gestures. For example, a third-party motion tracker system may provide one or more designated/labeled landmarks with position coordinates that correspond to different parts of fingers or hands. One of ordinary skill in the art will appreciate that one or more motion tracking services are conventionally available, such as, MediaPipe, Teachable Machine, Handfree.js, or the like.

Accordingly, in some embodiments, presenter motion information may be mapped to particular gestures. In some embodiments, gesture engines may be arranged to compare motion-tracked position information of different parts of the presenter's hands to determine one or more particular gestures. For example, if the motion tracker provides geometric information of the presenter's index finger, gesture engines may employ one or more models, heuristics, rules, or the like, to determine if the position of the index fingers corresponds to a 'point' gesture as represented by presenter hand motion 204. Thus, in some embodiments, gesture engines may be arranged to provide a gesture that may include a label that corresponds to the particular gesture type and the coordinates of relevant positions of the gesture.

In one or more of the various embodiments, gesture engines may be arranged to provide different coordinate information depending on the type of gesture. In some embodiments, some gestures may be defined by a range of motion, velocity of motion, or the like. Likewise, in some embodiments, one or more gestures may be defined by one or more of simultaneous motions of both hands of the presenter or relative positioning of the fingers of the presenter.

In this example, for hand motion 204, gesture engine 202 may provide gesture 206. Accordingly, gesture 206 may comprise one or more data structures that include gesture label 208 and position coordinates 210. Similarly, for example, in some embodiments, for hand motion 212, gesture engine 202 may be arranged to provide gesture 214 that includes gesture label 216, position coordinate 218, position coordinate 220, or the like. Further, in some embodiments, additional motion/geometric information may be provided, such as, direction, velocity, acceleration, z-axis position, B-splines, or the like. In some embodiments, the included information may vary depending on the type of gesture.

In some embodiments, gesture engines may be arranged to support an arbitrary number of different types of gestures. Accordingly, in some embodiments, as new or different gestures may be determined to be relevant presentations, support for those gestures may be added to gesture engines. In one or more of the various embodiments, gesture engines may be arranged to employ one or more libraries, plug-ins, machine-learning models, rules, instructions, or the like, that may be provided via configuration information for determining gestures. Thus, for example, in some embodiments, if support for a different gesture is added to a gesture engine, a corresponding library or other configuration information updates may be included to recognize the different gestures from tracked motions of presenters.

Also, in some embodiments, gesture engines may be arranged to map different motions to the same gesture. Accordingly, in some embodiments, different physical motions determined to correspond to a type of gesture may be supported. For example, in some cases, different presenters may use different motions to express that same intent. Thus, in such cases, the different motion information may be mapped to the same gesture using motion classifiers appropriate for each presenter.

FIG. 3 illustrates a logical schematic of a portion of presentation 300 for augmenting video with interactive visualizations in accordance with one or more of the various embodiments. As described above, presentations may be declared using presentation specifications that include the various directives that define the various presentation content. In this example, presentation portion 302 represents a zoomed-in view of a portion of a presentation. Accordingly, in this example, plot line 304 represents a segment of a plot line in a graph displayed in the presentation. In this example, for brevity and clarity, plot line 304 is represented as having some width represented by the gap between the two solid lines representing plot line 304.

In one or more of the various embodiments, gesture engines may be arranged to provide gestures (gesture information) to presentation engines (not shown). Accordingly, in some embodiments, presentation engines may be arranged to determine if the gesture may be associated with an interactive feature of the current presentation. In some embodiments, a presentation may be authored to include particular interactive features that may be responsive to particular gestures and unresponsive to other gestures. Thus, in some embodiments, one or more gestures provided by the gesture engine may be irrelevant to a current presentation scene.

Accordingly, in some embodiments, presentation engines may be arranged to compare gesture information provided by gesture engines to the interactive features defined for a given presentation. For example, in some embodiments, presentation engines may be arranged to perform hit-testing to determine if a gesture falls within a hit box corresponding to an interactive feature in the current presentation.

In this example, for some embodiments, gesture information 306 may represent a point gesture and gesture information 308A and 308B may represent a pinch gesture. Thus, in this example, if plot line 304 is associated with an interactive feature that may be activated by a point gesture, point gesture 306 may activate the interactive feature because it would be determined to be within the hit box of plot line 304. Similarly, in this example, if plot line 304 is associated with an interactive feature that may be activated by a pinch gesture, pinch gesture 308A, 308B may activate the interactive feature because it would be determined to be within the hit box of plot line 304 for a pinch gesture.

In one or more of the various embodiments, if a gesture may be determined to hit an interactive feature of the presentation, the presentation engine may be arranged to perform various scripted actions that may be associated with the activated interactive feature as authored by the author of the presentation specification that corresponds to the presentation. For example, in some embodiments, point gesture 306 may activate an interactive feature that changes the color of plot line 304, change the appearance of another plot line or plot feature, display another plot or table associated with plot line 304, or the like. Similarly, for example, pinch gesture 308A, 308B may activate an interactive feature that narrows or widens the width of plot line 304 depending on the duration or direction of 'pinching' motion associated with pinch gesture 308A, 308B.

One of ordinary skill in the art will appreciate that the type of actions associated with interactive features or the availability of interactive features themselves may be somewhat arbitrary as they may be defined by the author of the presentation specification using one or more directives that may correspond to one or more actions or the one or more interactive features that may be supported by the presentation engine.

Further, in some embodiments, different presentation objects may support different interactive features. Accordingly, in some embodiments, the availability of a particular interactive feature may depend on the type of presentation object that may be of interest.

FIG. 4 illustrates a logical schematic of view window 400 for augmenting video with interactive visualizations in accordance with one or more of the various embodiments. As described above, presentation engines may be arranged to overlay information determined from a presentation specification onto a video stream that may be displayed in a view window of a video conference service application. In this example, for clarity and brevity, the presenter is not shown. In practice, the presenter of the presentation may be visible 'behind' the presentation information shown in the presentation overlay.

In one or more of the various embodiments, presentation authors may be enabled to author presentations where two or more interactive features may be associated or otherwise dependent on other one or more interactive features. Accordingly, in some embodiments, the activation of a first interactive feature may activate one or more other interactive features. For example, a legend presentation object, such as, legend 404 that shows different categories of data represented by the plots rendered in view 402 may be included in a presentation. Accordingly, for example, the presentation specification corresponding to view 402 may include one or more directives that link categories in legend 404 to particular plot lines in a graph. In this example, category 406A may be associated with plot line 406B. Thus, in this example, if the presentation engine determines that a point gesture hits category 406A, it may trigger one or more actions for plot line 406B at the discretion of the presentation author. For example, such actions may include, changing colors of the line, isolating or emphasizing plot line 406B, changing to a different chart, navigating to a presentation scene that may be directed to the selected category, or the like.

FIG. 5 illustrates an example of a portion of presentation specification 500 for augmenting video with interactive visualizations in accordance with one or more of the various embodiments. As described above, presentation engines may be arranged to generate presentations from presentation specifications that include various directives that may declare or define the contents (presentation objects) and interactive features that may be included in the presentations. Further, in some embodiments, presentation engines may be arranged to support an extensible set of presentation directives. Also, in some embodiments, presentation engines may be arranged to parse various representations of such directives. For example, in some embodiments, presentation specifications may be represented using XML, JavaScript, JSON, TypeScript, Python, or the like, depending on the availability of parsers, formatters, or the like. Also, in some embodiments, as additional presentation directives may be determined or designed, grammars, parses, rules, or the like, supporting the additional presentation directives may be provided to presentation engines via configuration information. Also, in some embodiments, one or more transpilers may be arranged to convert different presentation specification formats into presentation specifications that may be processed or otherwise interpreted by presentation engines.

In this example, for some embodiments, presentation specification 500 is represented using JavaScript. One of ordinary skill in the art will appreciate that other programming languages or formats may be used without departing from the scope of the innovations described herein. Accordingly, this non-limiting example is presented here as a non-limiting example of a presentation specification.

In this example, for some embodiments, presentation specification 500 includes list (array) 502 that declares the one or more presentation scenes that comprise the presentation. In some embodiments, scenes, such as, scene 504 may include directives for declaring one or more presentation objects for the scene. In this example, label 506 defines text that describes the scene to the viewer. Also, in this example, object 508 may be declaring a chart/plot and some of its properties, including positioning information, active interactive features, or the like. In this example, property 510 represents an interactive feature that may be enabled for a presentation object. As mentioned above, presentation specifications may declare more than one scene. Accordingly, in this example, scene 512 represents the declaration of another scene in presentation specification 500.

Further, in some embodiments, presentation specification directives may include declarations of one or more charts/plots and their properties. In this example, for some embodiments, addNewChartObject 514 represents a directive for declaring a chart presentation object. In some cases, for some embodiments, a chart presentation object may be associated with a data source, in this example, such as a directive is represented by property 516.

One of ordinary skill in the art will appreciate that presentation specifications may include an arbitrary number of scenes and each presentation scene may include an arbitrary number of presentation objects depending on the user that may author the presentation specification. Further, in some embodiments, the set of presentation objects, interactive features, object properties, or the like, supported by presentation engines may be extended or modified based on libraries, plug-ins, rules, instructions, or the like, provided by configuration information. Thus, in some embodiments, as new presentation objects or interactive features may be developed, presentation engines may be configured to support the new presentation objects or interactive features. In some embodiments, a presentation author's access to one or more presentation objects or one or more interactive features may be determined based on user licensing, user role, or the like. Also, in some embodiments, one or more presentation objects may be directed to particular problem domains, industries, locales, or the like. Accordingly, in some embodiments, presentation engines may employ configuration information to determine the availability of one or more presentation objects or one or more interactive features.

Generalized Operations

Figure 6:
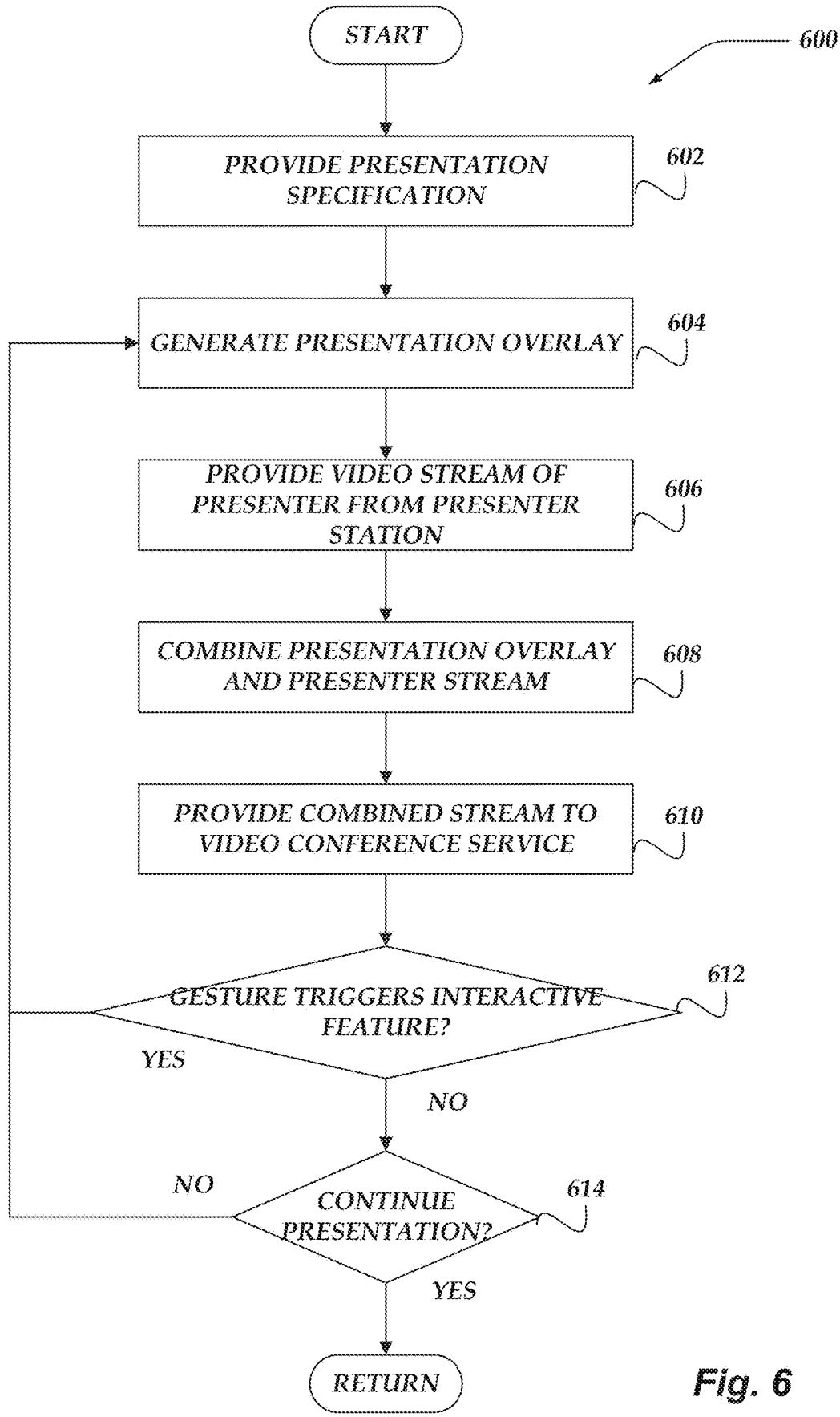
FIG. 6 illustrates an overview flowchart for a process for augmenting video with interactive visualizations in accordance with one or more of the various embodiments.
Figure 7:
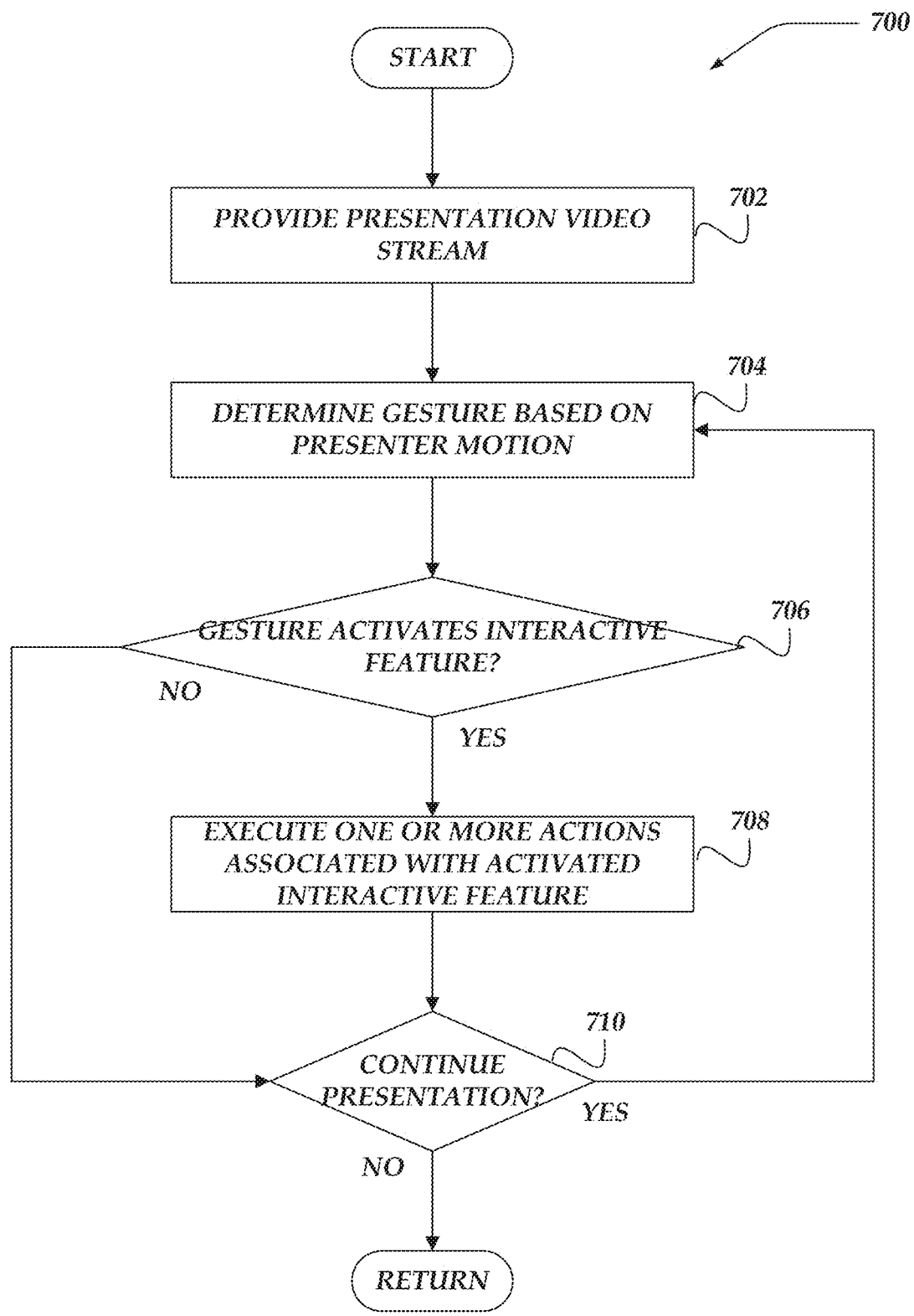
FIG. 7 illustrates a flowchart for a process for augmenting video with interactive visualizations in accordance with one or more of the various embodiments.
Figure 8:
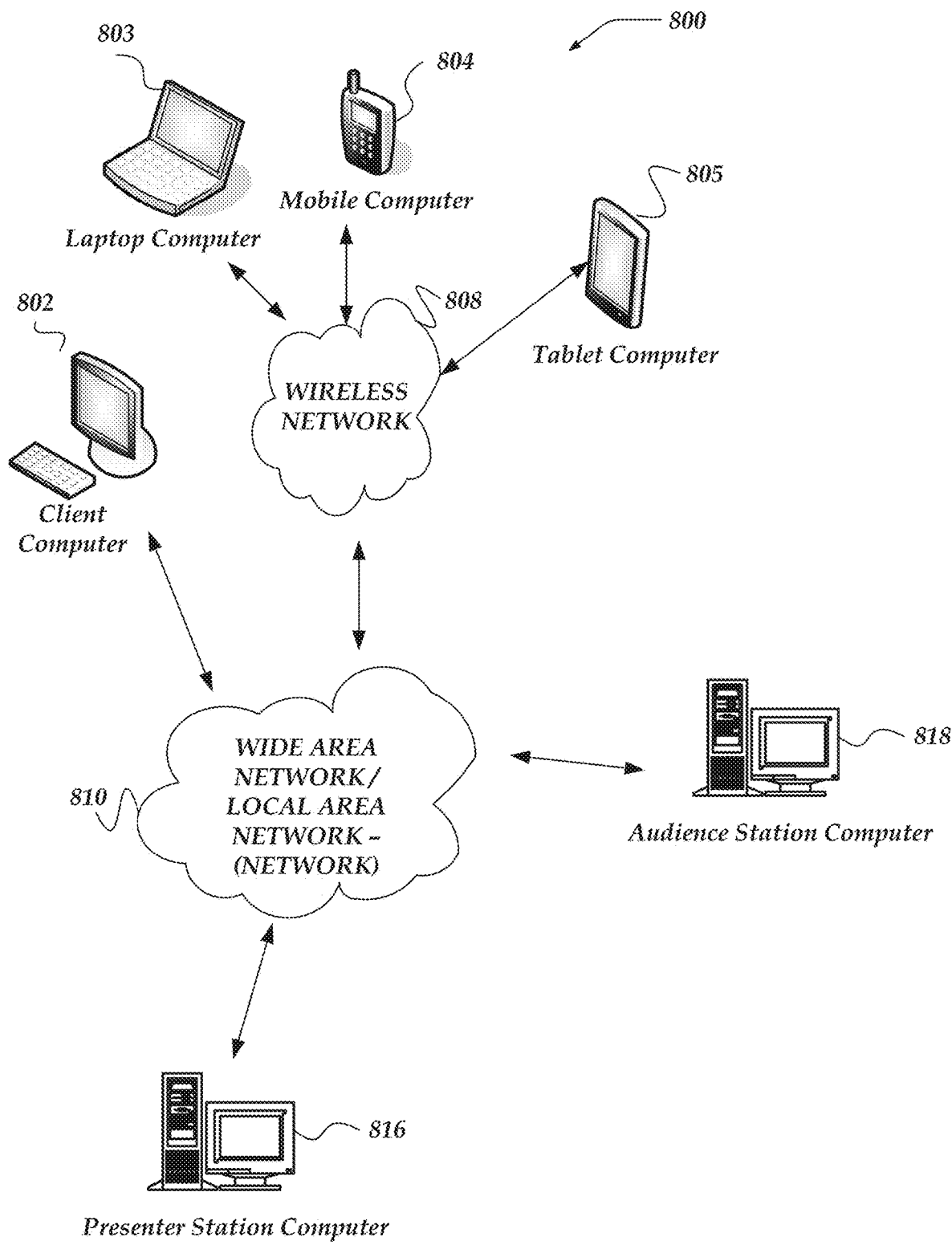
FIG. 8 shows components of one embodiment of an environment in which embodiments of these innovations may be practiced.

FIGS. 6-8 represent generalized operations for augmenting video with interactive visualizations in accordance with one or more of the various embodiments. In one or more of the various embodiments, processes 600, 700, and 800 described in conjunction with FIGS. 6-8 may be implemented by or executed by one or more processors on a single network computer, such as network computer 1100 of FIG. 11. In other embodiments, these processes, or portions thereof, may be implemented by or executed on a plurality of network computers, such as network computer 1100 of FIG. 11. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 6-8 may be used for augmenting video with interactive visualizations in accordance with at least one of the various embodiments or architectures such as those described in conjunction with FIGS. 1-5. Further, in one or more of the various embodiments, some or all of the actions performed by processes 600, 700, and 800 may be executed in part by presentation engine 1122, gesture engine 1124, or the like, or the like, running on one or more processors of one or more network computers.

FIG. 6 illustrates an overview flowchart for process 600 for augmenting video with interactive visualizations in accordance with one or more of the various embodiments. After a start block, at block 602, in one or more of the various embodiments, presentation engines may be arranged to be provided a presentation specification. As described above, presentation authors may be enabled to create presentation specifications. In some embodiments, authoring tools that help users create presentation specifications may be provided. In some embodiments, presentation specifications may be hidden from casual users such that they may be unaware of the particular directives employed that comprise a presentation specification. Alternatively, in some embodiments, users may be enabled to generate presentation specifications by directly entering presentation directives into a file using a text-based editor.

In some embodiments, presentation specifications may be selected or presented by users other than the author of the presentation specification.

At block 604, in one or more of the various embodiments, presentation engines may be arranged to generate a presentation overlay based on the presentation specification. In one or more of the various embodiments, presentation overlays may be considered to appear similar to a conventional presentation that has a transparent background. Accordingly, in some embodiments, presentation overlays may include one or more presentation objects representing various plots, graphs, legends, annotations, labels, or the like, that may comprise a presentation scene.

At block 606, in one or more of the various embodiments, presentation engines may be arranged to be provided a video stream of the presenter from the presenter station. As described above, a webcam or other video camera used by the presenter may generate a video stream of the presenter. This video stream may be considered a 'normal' video stream that may be provided by a webcam, or the like, during a video conference absent a presentation overlay. In some embodiments, the video may be mirrored horizontally before applying the presentation overlay, which may improve hand-eye coordination of the presenter with respect to their view the presentation overlays. Accordingly, in some embodiments, a presenter positioned in front of the presenter station may be prominently displayed in the view window associated with this video stream.

At block 608, in one or more of the various embodiments, presentation engines may be arranged to combine the presentation overlay and presenter video stream. As described above, video compositors may be arranged to combine the presentation overlays with the presenter video streams to provide combined presentation video streams. In some embodiments, these streams may provide a view window that shows the presenter appearing behind the presentation overlay. Thus, in some embodiments, the presenter and presentation overlay may be displayed at the same time in the same view window.

At block 610, in one or more of the various embodiments, presentation engines may be arranged to provide the combined video stream to a video conference service.

In one or more of the various embodiments, video conference services may be employed to provide various other features, such as, distributing video streams, managing audience members, recording, managing the positioning of view windows on audience or presenter stations, or the like.

In one or more of the various embodiments, the combined presentation video stream may be provided to the video conference as if it was coming directly from the webcam of the presenter station. Accordingly, in some embodiments, the video conference service does not need to be aware of the interactive features, or the like, associated with the presentation. Thus, advantageously, in some embodiments, conventional video conference services may be employed by both the presenter and the audience members.

At decision block 612, in one or more of the various embodiments, if one or more gestures activate one or more interactive features, control may loop back to block 604; otherwise, control may flow to decision block 614.

As described above, in some embodiments, a gesture engine may be processing/monitoring the presenter video stream to determine one or more gestures based on tracked motions of the presenter. Accordingly, in some embodiments, if the gesture engine determines one or more gestures from the tracked presenter motion, gesture information may be provided to the presentation engine. Accordingly, in some embodiments, if the provided gestures activate one or more interactive features, the presentation engine may modify the appearance of the presentation overlay in response to the one or more gestures. Also, in some embodiments, if a gesture may be determined to miss the interactive features defined in a presentation, the gesture(s) may be ignored. For example, in some embodiments, if a point gesture is determined by a gesture engine, it may be ignored by the presentation engine if the geometric coordinates associated with the point gesture fail to intersect with a hit-box for a point-responsive interactive feature.

Also, in some embodiments, presentation specification directives associated with one or more presentation objects may require one or more additional/other conditions being met before activating an interactive feature.

At decision block 614, in one or more of the various embodiments, if presentation may continue, control may loop back to block 604; otherwise, control may be returned to a calling process.

In one or more of the various embodiments, in some cases, activating an interactive feature may trigger actions that result in changes to the appearance of the presentation overlay. Accordingly, in some embodiments, presentation engines may be arranged to redraw/update the presentation overlay in response to one or more activated interactive features. In some cases, an interaction such as advancing the presentation to a next presentation scene may be responsive to a command input provided by the presenter rather than a gesture.

FIG. 7 illustrates a flowchart for process 700 for augmenting video with interactive visualizations in accordance with one or more of the various embodiments. After a start block, at block 702, in one or more of the various embodiments, presentation engines may be arranged to provide a video stream of a presentation. As described above, presentation engines may be arranged to compile or otherwise interpret presentation specifications to determine one or more presentation scene overlays that may be combined (composited) with a video stream of the presenter. In one or more of the various embodiments, the presentation video stream (that includes the presentation overlay in the foreground and the view of the presenter positioned behind the presentation overlay) may be provided to a video conference service that one or more audience members may view on audience stations. Likewise, in some embodiments, the video conference service may provide the same video provided to the audience members to the presenter to view on the presenter station.

At block 704, in one or more of the various embodiments, gesture engines may be arranged to determine one or more gestures based on motions of the presenter. In one or more of the various embodiments, the video stream from the presenter stations may be provided to a gesture engine. In some embodiments, the video stream may be provided directly from a video camera that the presenter uses to participate in the video conference. Accordingly, in some embodiments, before a presentation is started, the presenter may appear in the video conference view windows similar to other participants in the video conference.

Accordingly, in some embodiments, gesture engines may be arranged to perform machine vision to track one or more motions of the presenter to determine if one or more of the tracked motions correspond to one or more gestures. In some embodiments, gesture engines may be arranged to forward a video stream that includes the presenter to a motion tracking service that may provide motion tracking information that the gesture engine may evaluate to determine gestures. Also, in some embodiments, gesture engines may be arranged to employ one or more local tracking systems or motion classifiers that may determine motion tracking information based on the motion of the presenter.

In some embodiments, one or more gestures may be determined based on motion tracking information that may be associated with hand or finger movements of the presenter. Also, in some embodiments, gesture engines may be arranged to determine other motion information, such as, eye tracking information, eye shapes, mouth shapes, head position, posture, or the like.

In one or more of the various embodiments, gesture engines may be arranged to map motion tracking information to one or more defined gestures. Accordingly, in some embodiments, the determined gestures may be provided to the presentation engine to interpret with respect to the current presentation scene.

Accordingly, in some embodiments, presentation engines may be arranged to execute one or more hit-testing actions to determine the gestures that may activate one or more interactive features that may be included in the presentation scene. For example, in some embodiments, one or more interactive features may be determined to have a hit-box that corresponds to a portion of a view window. Accordingly, in some embodiments, if the geometric coordinates corresponding to a gesture may intersect with a hit-box corresponding to an interactive feature, the presentation engine may activate that interactive feature.

Note, in some embodiments, the positioning or dimensions of a hit-box for an interactive feature vary depending on the type of interactive features. Also, in some embodiments, presentation specifications may include one or more directives or attributes that enable presentation authors to define hit-boxes for some or all interactive features. For example, an interactive feature associated with a plot line of a chart may have its hit-box determined based on dimensions of the plot line as it appears in the presentation.

In one or more of the various embodiments, gesture engines may be arranged to employ one or more gesture models that encapsulate the data structures, rules, heuristics, classifiers, or the like, that may be used to determine gestures from motion tracking information.

At decision block 706, in one or more of the various embodiments, if one or more gestures activate one or more interactive features of the presentation, control may flow to block 708; otherwise, control may flow to decision block 710. As described above, gestures that may be determined to land within the hit-box of an interactive feature may be considered to be activated. Also, in some embodiments, in some cases, there may be one or more additional conditions or considerations that may be evaluated before determining if an interactive feature may be activated. For example, in some embodiments, presentation engines may be arranged to consider velocity information that may be associated with one or more gestures to determine if they may be activated. Likewise, in one or more of the various embodiments, presentation engines may be arranged to enable presentation authors to associate one or more programmatic conditions/tests with one or more interactive features. Accordingly, in some embodiments, presentation engines may be arranged to evaluate those one or more programmatic conditions/tests as part of determining if interactive features may be activated.

At block 708, in one or more of the various embodiments, presentation engines may be arranged to execute one or more actions associated with the one or more activated interactive features. As described above, in some embodiments, presentation specifications may associate one or more actions with one or more interactive features.

In one or more of the various embodiments, presentation engines may be arranged to generate one or more presentation objects based on a presentation specification. In some embodiments, one or more presentation objects may be configured with one or more actions to perform in response to one or more activated interactions. Also, in some embodiments, presentation specifications may enable presentation authors to associate custom actions with presentation objects or interactive features. For example, in some embodiments, a first presentation may be authored such that 'pointing' at a plot line may cause the color of the plot line to change, while another presentation may be authored such that pointing at a plot line opens another view of the data corresponding to the 'pointed-at' plot line. Further, in some embodiments, one or more presentation objects may be associated with one or more default actions associated with one or more types of gestures. Accordingly, in some cases, for some embodiments, one or more presentation objects may be automatically responsive to particular gestures.

At decision block 710, if the presentation may continue, control may loop back to block 704; otherwise, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Illustrated Operating Environment

FIG. 8 shows components of one embodiment of an environment in which embodiments of these innovations may be practiced. Not all of the components may be required to practice the invention, and variations in the arrangement and type of the components may be made without departing from the spirit or scope of the invention. As shown, system 800 of FIG. 8 includes local area networks (LANs)/wide area networks (WANs)–(network) 810, wireless network 808, client computers 802-805, presenter station computer 816, audience station computer 818, or the like.

At least one embodiment of client computers 802-805 is described in more detail below in conjunction with FIG. 2. In one embodiment, at least some of client computers 802-805 may operate over one or more wired or wireless networks, such as networks 808, or 810. Generally, client computers 802-805 may include virtually any computer capable of communicating over a network to send and receive information, perform various online activities, offline actions, or the like. In one embodiment, one or more of client computers 802-805 may be configured to operate within a business or other entity to perform a variety of services for the business or other entity. For example, client computers 802-805 may be configured to operate as a web server, firewall, client application, media player, mobile telephone, game console, desktop computer, or the like. However, client computers 802-805 are not constrained to these services and may also be employed, for example, as for end-user computing in other embodiments. It should be recognized that more or less client computers (as shown in FIG. 8) may be included within a system such as described herein, and embodiments are therefore not constrained by the number or type of client computers employed.

Computers that may operate as client computer 802 may include computers that typically connect using a wired or wireless communications medium such as personal computers, multiprocessor systems, microprocessor-based or programmable electronic devices, network PCs, or the like. In some embodiments, client computers 802-805 may include virtually any portable computer capable of connecting to another computer and receiving information such as, laptop computer 803, mobile computer 804, tablet computers 805, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 802-805 typically range widely in terms of capabilities and features.

Moreover, client computers 802-805 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 802-805 also may include at least one other client application that is configured to receive or send content between another computer. The client application may include a capability to send or receive content, or the like. The client application may further provide information that identifies itself, including a type, capability, name, and the like. In one embodiment, client computers 802-805 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, presenter station computer 816, audience station computer 818, or other computers.

Client computers 802-805 may further be configured to include a client application that enables an end-user to log into an end-user account that may be managed by another computer, such as presenter station computer 816, audience station computer 818, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by presenter station computer 816, audience station computer 818, or the like.

Wireless network 808 is configured to couple client computers 803-805 and its components with network 810. Wireless network 808 may include any of a variety of wireless sub-networks that may further overlay stand-alone ad-hoc networks, and the like, to provide an infrastructure-oriented connection for client computers 803-805. Such sub-networks may include mesh networks, Wireless LAN (WLAN) networks, cellular networks, and the like. In one embodiment, the system may include more than one wireless network.

Wireless network 808 may further include an autonomous system of terminals, gateways, routers, and the like connected by wireless radio links, and the like. These connectors may be configured to move freely and randomly and organize themselves arbitrarily, such that the topology of wireless network 808 may change rapidly.

Wireless network 808 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 803-805 with various degrees of mobility. In one non-limiting example, wireless network 808 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 808 may include virtually any wireless communication mechanism by which information may travel between client computers 803-805 and another computer, network, a cloud-based network, a cloud instance, or the like.

Network 810 is configured to couple network computers with other computers, including, presenter station computer 816, audience station computer 818, client computers 802, and client computers 803-805 through wireless network 808, or the like. Network 810 is enabled to employ any form of computer readable media for communicating information from one electronic device to another. Also, network 810 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 810 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, embodiments of presenter station computer 816 or audience station computer 818 is described in more detail below in conjunction with FIG. 9 or FIG. 10. Although FIG. 8 illustrates presenter station computer 816, audience station computer 818, or the like, as single computers, the innovations or embodiments are not so limited. For example, one or more functions of presenter station computer 816, audience station computer 818, or the like, may be distributed across one or more distinct network computers. Moreover, in one or more embodiments, presenter station computer 816, audience station computer 818, may be implemented using a plurality of network computers. Further, in one or more of the various embodiments, presenter station computer 816, audience station computer 818, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 9:
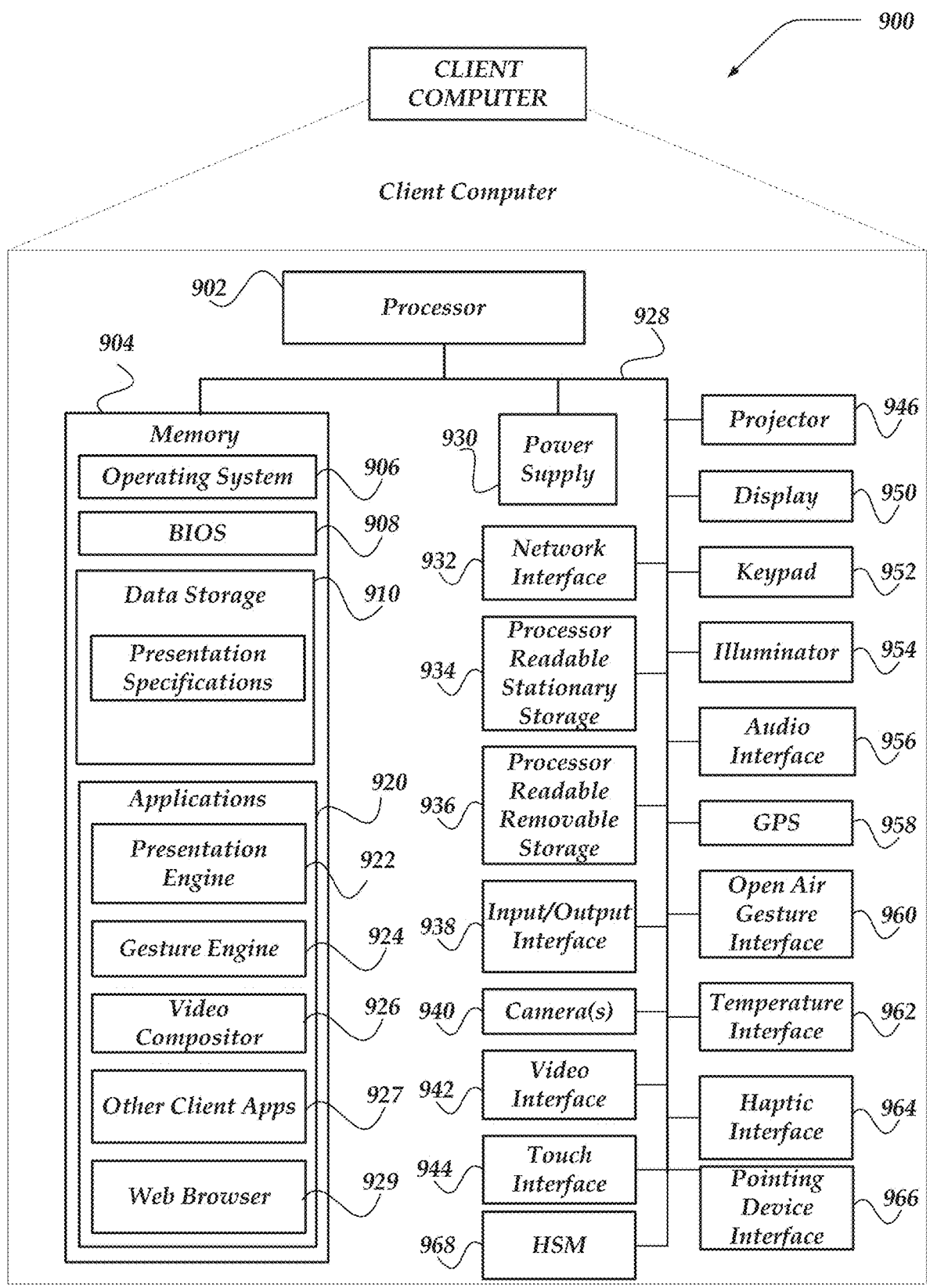
FIG. 9 shows one embodiment of a client computer that may include many more or less components than those shown.

FIG. 9 shows one embodiment of client computer 900 that may include many more or less components than those shown. Client computer 900 may represent, for example, one or more embodiment of mobile computers or client computers shown in FIG. 13.

Client computer 900 may include processor 902 in communication with memory 904 via bus 928. Client computer 900 may also include power supply 930, network interface 932, audio interface 956, display 950, keypad 952, illuminator 954, video interface 942, input/output interface 938, haptic interface 964, global positioning systems (GPS) receiver 958, open air gesture interface 960, temperature interface 962, camera(s) 940, projector 946, pointing device interface 966, processor-readable stationary storage device 934, and processor-readable removable storage device 936. Client computer 900 may optionally communicate with a base station (not shown), or directly with another computer. And in one embodiment, although not shown, a gyroscope may be employed within client computer 900 to measuring or maintaining an orientation of client computer 900.

Power supply 930 may provide power to client computer 900. A rechargeable or non-rechargeable battery may be used to provide power. The power may also be provided by an external power source, such as an AC adapter or a powered docking cradle that supplements or recharges the battery.

Network interface 932 includes circuitry for coupling client computer 900 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 932 is sometimes known as a transceiver, transceiving device, or network interface card (MC).

Audio interface 956 may be arranged to produce and receive audio signals such as the sound of a human voice. For example, audio interface 956 may be coupled to a speaker and microphone (not shown) to enable telecommunication with others or generate an audio acknowledgment for some action. A microphone in audio interface 956 can also be used for input to or control of client computer 900, e.g., using voice recognition, detecting touch based on sound, and the like.

Display 950 may be a liquid crystal display (LCD), gas plasma, electronic ink, light emitting diode (LED), Organic LED (OLED) or any other type of light reflective or light transmissive display that can be used with a computer. Display 950 may also include a touch interface 944 arranged to receive input from an object such as a stylus or a digit from a human hand, and may use resistive, capacitive, surface acoustic wave (SAW), infrared, radar, or other technologies to sense touch or gestures.

Projector 946 may be a remote handheld projector or an integrated projector that is capable of projecting an image on a remote wall or any other reflective object such as a remote screen.

Video interface 942 may be arranged to capture video images, such as a still photo, a video segment, an infrared video, or the like. For example, video interface 942 may be coupled to a digital video camera, a web-camera, or the like. Video interface 942 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 952 may comprise any input device arranged to receive input from a user. For example, keypad 952 may include a push button numeric dial, or a keyboard. Keypad 952 may also include command buttons that are associated with selecting and sending images.

Illuminator 954 may provide a status indication or provide light. Illuminator 954 may remain active for specific periods of time or in response to event messages. For example, when illuminator 954 is active, it may back-light the buttons on keypad 952 and stay on while the client computer is powered. Also, illuminator 954 may back-light these buttons in various patterns when particular actions are performed, such as dialing another client computer. Illuminator 954 may also cause light sources positioned within a transparent or translucent case of the client computer to illuminate in response to actions.

Further, client computer 900 may also comprise hardware security module (HSM) 968 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 968 may be a stand-alone computer, in other cases, HSM 968 may be arranged as a hardware card that may be added to a client computer.

Client computer 900 may also comprise input/output interface 938 for communicating with external peripheral devices or other computers such as other client computers and network computers. The peripheral devices may include an audio headset, virtual reality headsets, display screen glasses, remote speaker system, remote speaker and microphone system, and the like. Input/output interface 938 can utilize one or more technologies, such as Universal Serial Bus (USB), Infrared, WiFi, WiMax, Bluetooth™, and the like.

Input/output interface 938 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 900.

Haptic interface 964 may be arranged to provide tactile feedback to a user of the client computer. For example, the haptic interface 964 may be employed to vibrate client computer 900 in a particular way when another user of a computer is calling. Temperature interface 962 may be used to provide a temperature measurement input or a temperature changing output to a user of client computer 900. Open air gesture interface 960 may sense physical gestures of a user of client computer 900, for example, by using single or stereo video cameras, radar, a gyroscopic sensor inside a computer held or worn by the user, or the like. Camera 940 may be used to track physical motions of a user, such as, hand, finder, or eye movements of a user of client computer 900.

GPS transceiver 958 can determine the physical coordinates of client computer 900 on the surface of the Earth, which typically outputs a location as latitude and longitude values. GPS transceiver 958 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 900 on the surface of the Earth. It is understood that under different conditions, GPS transceiver 958 can determine a physical location for client computer 900. In one or more embodiments, however, client computer 900 may, through other components, provide other information that may be employed to determine a physical location of the client computer, including for example, a Media Access Control (MAC) address, IP address, and the like.

In at least one of the various embodiments, applications, such as, operating system 906, presentation engine 922, gesture engine 924, video compositor 926, other client apps 927, web browser 929, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 958. Also, in some embodiments, geolocation information may include information provided using one or more geolocation protocols over the networks, such as, wireless network 808 or network 810.

Human interface components can be peripheral devices that are physically separate from client computer 900, allowing for remote input or output to client computer 900. For example, information routed as described here through human interface components such as display 950 or keyboard 952 can instead be routed through network interface 932 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 926 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 904 may include RAM, ROM, or other types of memory. Memory 904 illustrates an example of computer-readable storage media (devices) for storage of information such as computer-readable instructions, data structures, program modules or other data. Memory 904 may store BIOS 908 for controlling low-level operation of client computer 900. The memory may also store operating system 906 for controlling the operation of client computer 900. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 904 may further include one or more data storage 910, which can be utilized by client computer 900 to store, among other things, applications 920 or other data. For example, data storage 910 may also be employed to store information that describes various capabilities of client computer 900. The information may then be provided to another device or computer based on any of a variety of methods, including being sent as part of a header during a communication, sent upon request, or the like. Data storage 910 may also be employed to store social networking information including address books, buddy lists, aliases, user profile information, or the like. Data storage 910 may further include program code, data, algorithms, and the like, for use by a processor, such as processor 902 to execute and perform actions. In one embodiment, at least some of data storage 910 might also be stored on another component of client computer 900, including, but not limited to, non-transitory processor-readable removable storage device 936, processor-readable stationary storage device 934, or even external to the client computer.

Applications 920 may include computer executable instructions which, when executed by client computer 900, transmit, receive, or otherwise process instructions and data. Applications 920 may include, for example, presentation engine 922, gesture engine 924, video compositor 926, other client apps 927, web browser 929, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 900 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 900 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 10:
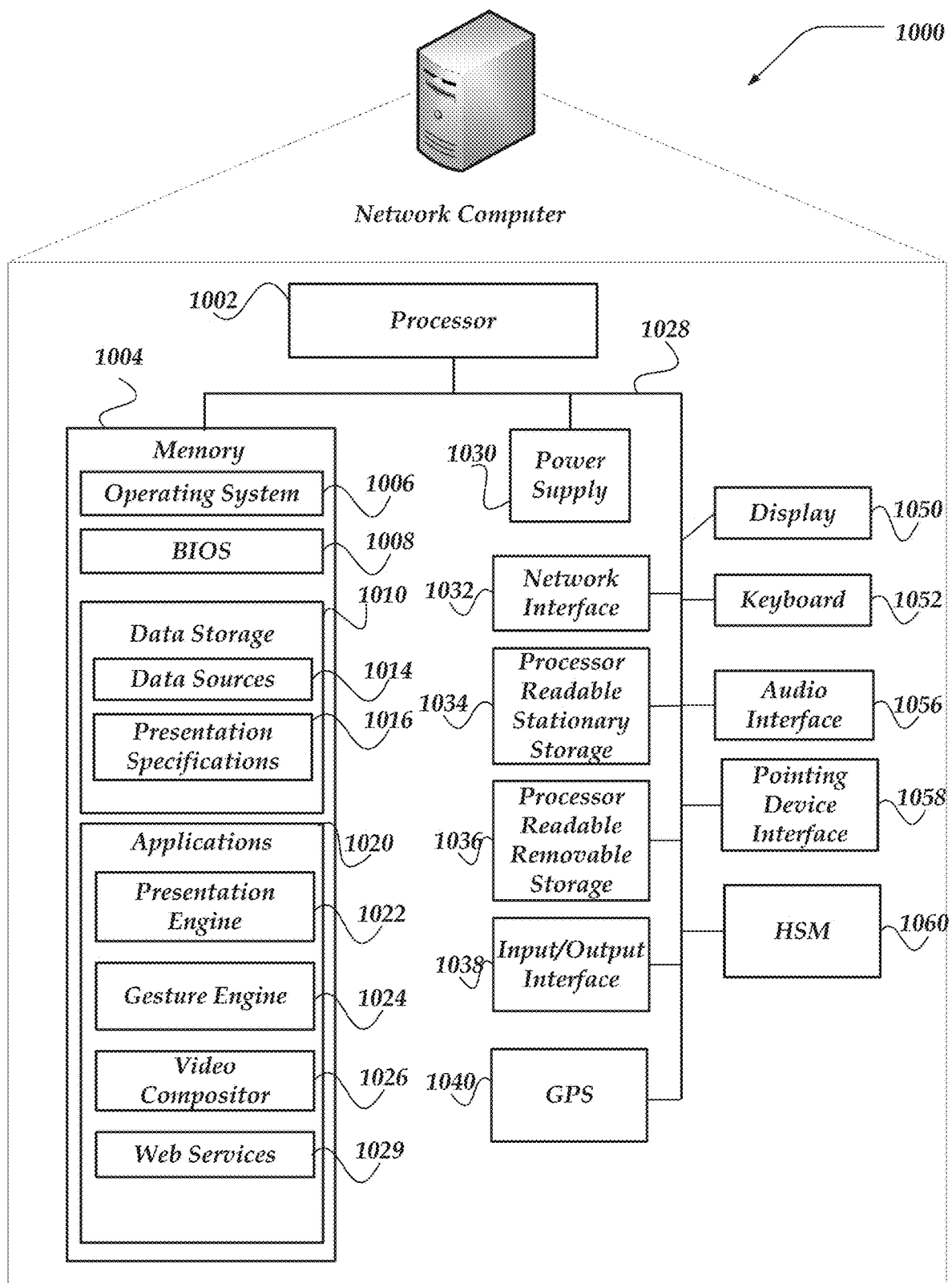
FIG. 10 shows one embodiment of a network computer that may be included in a system implementing one or more of the various embodiments.

FIG. 10 shows one embodiment of network computer 1000 that may be included in a system implementing one or more of the various embodiments. Network computer 1000 may include many more or less components than those shown in FIG. 10. However, the components shown are sufficient to disclose an illustrative embodiment for practicing these innovations. Network computer 1000 may represent, for example, one embodiment of at least one of presenter station computer 816, audience station computer 818, or the like, of FIG. 8.

Network computers, such as, network computer 1000 may include a processor 1002 that may be in communication with a memory 1004 via a bus 1028. In some embodiments, processor 1002 may be comprised of one or more hardware processors, or one or more processor cores. In some cases, one or more of the one or more processors may be specialized processors designed to perform one or more specialized actions, such as, those described herein. Network computer 1000 also includes a power supply 1030, network interface 1032, audio interface 1056, display 1050, keyboard 1052, input/output interface 1038, processor-readable stationary storage device 1034, and processor-readable removable storage device 1036. Power supply 1030 provides power to network computer 1000.

Network interface 1032 includes circuitry for coupling network computer 1000 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 1032 is sometimes known as a transceiver, transceiving device, or network interface card (NIC). Network computer 1000 may optionally communicate with a base station (not shown), or directly with another computer.

Audio interface 1056 is arranged to produce and receive audio signals such as the sound of a human voice. For example, audio interface 1056 may be coupled to a speaker and microphone (not shown) to enable telecommunication with others or generate an audio acknowledgment for some action. A microphone in audio interface 1056 can also be used for input to or control of network computer 1000, for example, using voice recognition.

Display 1050 may be a liquid crystal display (LCD), gas plasma, electronic ink, light emitting diode (LED), Organic LED (OLED) or any other type of light reflective or light transmissive display that can be used with a computer. In some embodiments, display 1050 may be a handheld projector or pico projector capable of projecting an image on a wall or other object.

Network computer 1000 may also comprise input/output interface 1038 for communicating with external devices or computers not shown in FIG. 10. Input/output interface 1038 can utilize one or more wired or wireless communication technologies, such as USB™, Firewire™ WiFi, WiMax, Thunderbolt™, Infrared, Bluetooth™, Zigbee™, serial port, parallel port, and the like.

Also, input/output interface 1038 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 1000. Human interface components can be physically separate from network computer 1000, allowing for remote input or output to network computer 1000. For example, information routed as described here through human interface components such as display 1050 or keyboard 1052 can instead be routed through the network interface 1032 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 1058 to receive user input.

GPS transceiver 1040 can determine the physical coordinates of network computer 1000 on the surface of the Earth, which typically outputs a location as latitude and longitude values. GPS transceiver 1040 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 1000 on the surface of the Earth. It is understood that under different conditions, GPS transceiver 1040 can determine a physical location for network computer 1000. In one or more embodiments, however, network computer 1000 may, through other components, provide other information that may be employed to determine a physical location of the client computer, including for example, a Media Access Control (MAC) address, IP address, and the like.

In at least one of the various embodiments, applications, such as, operating system 1006, presentation engine 1022, gesture engine 1024, video compositor 1026, web services 1029, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 1040. Also, in some embodiments, geolocation information may include information provided using one or more geolocation protocols over the networks, such as, wireless network 808 or network 810.

Memory 1004 may include Random Access Memory (RAM), Read-Only Memory (ROM), or other types of memory. Memory 1004 illustrates an example of computer-readable storage media (devices) for storage of information such as computer-readable instructions, data structures, program modules or other data. Memory 1004 stores a basic input/output system (BIOS) 1008 for controlling low-level operation of network computer 1000. The memory also stores an operating system 1006 for controlling the operation of network computer 1000. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 1004 may further include one or more data storage 1010, which can be utilized by network computer 1000 to store, among other things, applications 1020 or other data. For example, data storage 1010 may also be employed to store information that describes various capabilities of network computer 1000. The information may then be provided to another device or computer based on any of a variety of methods, including being sent as part of a header during a communication, sent upon request, or the like. Data storage 1010 may also be employed to store social networking information including address books, buddy lists, aliases, user profile information, or the like. Data storage 1010 may further include program code, data, algorithms, and the like, for use by a processor, such as processor 1002 to execute and perform actions such as those actions described below. In one embodiment, at least some of data storage 1010 might also be stored on another component of network computer 1000, including, but not limited to, non-transitory media inside processor-readable removable storage device 1036, processor-readable stationary storage device 1034, or any other computer-readable storage device within network computer 1000, or even external to network computer 1000. Data storage 1010 may include, for example, data sources 1014, collection specifications 1016, or the like.

Applications 1020 may include computer executable instructions which, when executed by network computer 1000, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 1020 may include presentation engine 1022, gesture engine 1024, video compositor 1026, web services 1029, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, presentation engine 1022, gesture engine 1024, video compositor 1026, web services 1029, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to presentation engine 1022, gesture engine 1024, video compositor 1026, or the like, may be provisioned and de-commissioned automatically.

Also, in one or more of the various embodiments, presentation engine 1022, gesture engine 1024, video compositor 1026, web services 1029, or the like, may be located in virtual servers running in a cloud-based computing environment rather than being tied to one or more specific physical network computers.

Further, network computer 1000 may also comprise hardware security module (HSM) 1060 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 1060 may be a stand-alone network computer, in other cases, HSM 1060 may be arranged as a hardware card that may be installed in a network computer.

Additionally, in one or more embodiments (not shown in the figures), network computer 1000 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

What is claimed as new and desired to be protected by Letters Patent of the United States is:

1. A method for modifying visualizations presented over a network in a video conference application, comprising:
    displaying one or more interactive data visualizations in a first user interface of a video conference application on a first computer system and in a second user interface of the video conference application on a second computer system connected to the first computer system via the network;
    receiving, via a video camera of the first computer system, a first video stream;
    displaying the first video stream in the second user interface of the video conference application on the second computer system;
    generating an overlay that includes the one or more interactive data visualizations
    generating a composited video stream that includes the first video stream and the overlay;
    displaying the composited video stream in the second user interface of the video conference application on the second computer system, wherein the overlay is displayed in a foreground of the composited video stream and the first video stream is displayed in a background, relative to the overlay displayed in the foreground, of the composited video stream;
    detecting, via the video camera of the first computer system, one or more predefined gestures; and
    in response to detecting the one or more predefined gestures:
        in accordance with the one or more predefined gestures being associated with an interactive feature of at least one of the one or more interactive data visualizations:
            modifying the one or more interactive data visualizations; and
            updating the overlay in the composited video stream with the one or more modified interactive data visualizations.

2. The method of claim 1, wherein detecting the one or more predefined gestures further comprises:
    determining motion information from the first video stream, wherein the motion information includes position information associated with one or more of hands, fingers, eyes, head, or posture of a user.

3. The method of claim 1, wherein detecting the one or more predefined gestures further comprises:
    tracking one or more physical movements of a user in the first video stream; and
    mapping the one or more physical movements to the one or more predefined gestures based on motion information that corresponds to the one or more physical movements and one or more gesture models.

4. The method of claim 1, wherein modifying the one or more interactive data visualizations further comprises:
    determining one or more activation conditions for the interactive feature; and
    determining the interactive feature based on one or more coordinates associated with the one or more predefined gestures and the one or more activation conditions.

5. The method of claim 1, wherein updating the overlay in the composited video stream with the one or more modified interactive data visualizations further comprises:
    determining the interactive feature of the at least one of the one or more interactive data visualizations
    determining one or more actions associated with the interactive feature of the at least one of the one or more interactive data visualizations; and
    executing the one or more actions associated with the interactive feature of the at least one of the one or more interactive data visualizations.

6. The method of claim 1, further comprising:
    in response to detecting the one or more predefined gestures:
        in accordance with a determination that the one or more predefined gestures are directed to a first presentation object of the at least one of the one or more interactive data visualizations, executing one or more actions with respect to the first presentation object.

7. A computer system having one or more processors and memory storing one or more programs, wherein the computer system is a first computer system connected to a second computer system via a network and the one or more programs are configured to be executed by the one or more processors, the one or more programs including instructions for:

displaying one or more interactive data visualizations in a first user interface of a video conference application on the first computer system and in a second user interface of the video conference application on the second computer system connected to the first computer system via the network:

receiving, via a video camera of the first computer system, a first video stream;

displaying the first video stream in the second user interface of the video conference application on the second computer system;

generating an overlay that includes the one or more interactive data visualizations;

generating a composited video stream that includes the first video stream and the overlay;

displaying the composited video stream in the second user interface of the video conference application on the second computer system, wherein the overlay is displayed in a foreground of the composited video stream and the first video stream is displayed in a background, relative to the overlay displayed in the foreground, of the composited video stream;

detecting, via the video camera of the first computer system, one or more predefined gestures; and in response to detecting the one or more predefined gestures:
  in accordance with the one or more predefined gestures being associated with an interactive feature of at least one of the one or more interactive data visualizations;
    modifying the one or more interactive data visualizations; and
    updating the overlay in the composited video stream with the one or more modified interactive data visualizations.

8. The system of claim 7, wherein detecting the one or more predefined gestures further comprises:
  determining motion information that includes position information associated with one or more of hands, fingers, eyes, head, or posture of a user.

9. The system of claim 7, wherein detecting the one or more predefined gestures further comprises:
  tracking one or more physical movements of a user in the first video stream; and
  mapping the one or more physical movements to the one or more predefined gestures based on motion information that corresponds to the one or more physical movements and one or more gesture models.

10. The computer system of claim 7, wherein modifying the one or more interactive data visualizations further comprises:
  determining one or more activation conditions for the interactive feature; and
  determining the interactive feature based on one or more coordinates associated with the one or more predefined gestures and the one or more activation conditions.

11. The computer system of claim 7, wherein updating the overlay in the composited video stream with the one or more modified interactive data visualizations further comprises:
  determining the interactive feature of the at least one of the one or more interactive data visualizations;
  determining one or more actions associated with the interactive feature of the at least one of the one or more interactive data visualizations; and
  executing the one or more actions associated with the interactive feature of the at least one of the one or more interactive data visualizations.

12. The computer system of claim 7, wherein the one or more programs including instructions for:
  in response to detecting the one or more predefined gestures:
    in accordance with a determination that the one or more predefined gestures are directed to a first presentation object:
      executing one or more actions with respect to first presentation object.

13. A non-transitory computer readable storage medium storing one or more programs comprising instructions which, when executed by a first computer system connected to a second computer system via a network, cause the first computer system to perform operations comprising:

displaying one or more interactive data visualizations in a first user interface of a video conference application on a first computer system and in a second user interface of the video conference application on a second computer system connected to the first computer system via the network;

receiving, via a video camera of the first computer system, a first video stream;

displaying the first video stream in the second user interface of the video conference application on the second computer system;

generating an overlay that includes the one or more interactive data visualizations;

generating a composited video stream that includes the first video stream and the overlay;

displaying the composited video stream in the second user interface of the video conference application on the second computer system, wherein the overlay is displayed in a foreground of the composited video stream and the first video stream is displayed in a background, relative to the overlay displayed in the foreground, of the composited video steam;

detecting, via the video camera of the first computer system, one or more predefined gestures; and in response to detecting the one or more predefined gestures:
  in accordance with the one or more predefined gestures being associated with an interactive feature of at least one of the one or more interactive data visualizations:
    modifying the one or more interactive data visualizations; and
    updating the overlay in the composited video stream with the one or more modified interactive data visualizations.

14. The non-transitory computer readable storage medium of claim 13, wherein detecting the one or more predefined gestures further comprises:
  determining motion information from the first video stream, wherein the motion information includes position information associated with one or more of hands, fingers eyes, head, or posture of a user.

15. the non-transitory computer readable storage medium of claim 13, wherein detecting the one or more predefined gestures further comprises:
  tracking one or more physical movements of a user in the first video stream; and
  mapping the one or more physical movements to the one or more predefined gestures based on motion information that corresponds to the one or more physical movements and one or more gesture models.

16. The non-transitory computer readable storage medium of claim 13, wherein modifying the one or more interactive data visualizations further comprises:
   determining one or more activation conditions for the interactive feature; and
   determining the interactive feature based on one or more coordinates associated with the one or more predefined gestures and the one or more activation conditions.

17. The non-transitory computer readable storage medium of claim 13, wherein updating the overlay in the composited video stream with the one or more modified interactive data visualizations further comprises:
   determining the interactive feature of the at least one of the one or more interactive data visualizations;
   determining one or more actions associated with the interactive feature of the at least one of the one or more interactive data visualizations; and
   executing the one or more actions associated with the interactive feature of the at least one of the one or more interactive data visualizations.

18. The non-transitory computer readable storage medium of claim 13, wherein the operations further comprising:
   in response to detecting the one or more predefined gestures:
      in accordance with a determination that the one or more predefined gestures are directed a first presentation object of the at least one of the one or more interactive data visualizations, executing one or more actions with respect to the first presentation object.

* * * * *